US010437528B2

(12) United States Patent
Tanaka et al.

(10) Patent No.: US 10,437,528 B2
(45) Date of Patent: Oct. 8, 2019

(54) CONTENT MANAGEMENT SYSTEM, CONTENT MANAGEMENT METHOD, AND RECORDING MEDIUM

(71) Applicant: Konica Minolta, Inc., Tokyo (JP)

(72) Inventors: Yuji Tanaka, Itami (JP); Hirokazu Kubota, Otsu (JP); Hiroaki Kubo, Muko (JP); Toshimichi Iwai, Nara (JP); Hisashi Uchida, Kyoto (JP); Hironori Harada, Amagasaki (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 15/954,726

(22) Filed: Apr. 17, 2018

(65) Prior Publication Data
US 2018/0314469 A1 Nov. 1, 2018

(30) Foreign Application Priority Data

Apr. 28, 2017 (JP) .................................. 2017-090209

(51) Int. Cl.
G06F 3/12 (2006.01)
H04N 1/64 (2006.01)
H04N 1/44 (2006.01)
H04W 8/22 (2009.01)

(52) U.S. Cl.
CPC ............ G06F 3/122 (2013.01); G06F 3/1274 (2013.01); H04N 1/44 (2013.01); H04N 1/642 (2013.01); G06F 3/1292 (2013.01); H04W 8/22 (2013.01)

(58) Field of Classification Search
CPC ........................................................ G06F 3/122
USPC ......................................................... 358/1.15
See application file for complete search history.

(56) References Cited

U.S. PATENT DOCUMENTS

2007/0019244 A1* 1/2007 Rekiere ............. H04N 1/32144
358/3.28
2008/0074711 A1* 3/2008 Rouhana .................. H04N 1/44
358/470

FOREIGN PATENT DOCUMENTS

JP 2008-118493 A 5/2008

* cited by examiner

Primary Examiner — Jacky X Zheng
(74) Attorney, Agent, or Firm — Osha Liang LLP

(57) ABSTRACT

A method includes: associating content with erasure completion information indicating the content has been erased; forming an image of the content and an image at a time of formation indicating the erasure completion information; in a case where an erasure image is formed to be superimposed on at least a part of the image of the content on the recording medium, forming an image at a time of discarding indicating the erasure completion information and the erasure image, where the image at the time of discarding is associated with the content; and in a case where the erasure completion information is identified by the image at the time of formation and the image at the time of discarding included in single image data output when the image capturing device image-captures the recording medium, determining that the content associated with the erasure completion information has been erased.

10 Claims, 18 Drawing Sheets

FIG. 7

| CONTENT IDENTIFICATION INFORMATION | MEDIUM IDENTIFICATION INFORMATION | ERASURE COMPLETION INFORMATION | DISCARD CODE |
|---|---|---|---|

FIG. 8

| ERASURE COMPLETION INFORMATION | GENERATION INFORMATION | | | | | |
|---|---|---|---|---|---|---|
| | IMAGE AT THE TIME OF FORMATION | FIRST COLOR | IMAGE POSITION | IMAGE AT THE TIME OF DISCARDING | SECOND COLOR | RELATIVE POSITION |

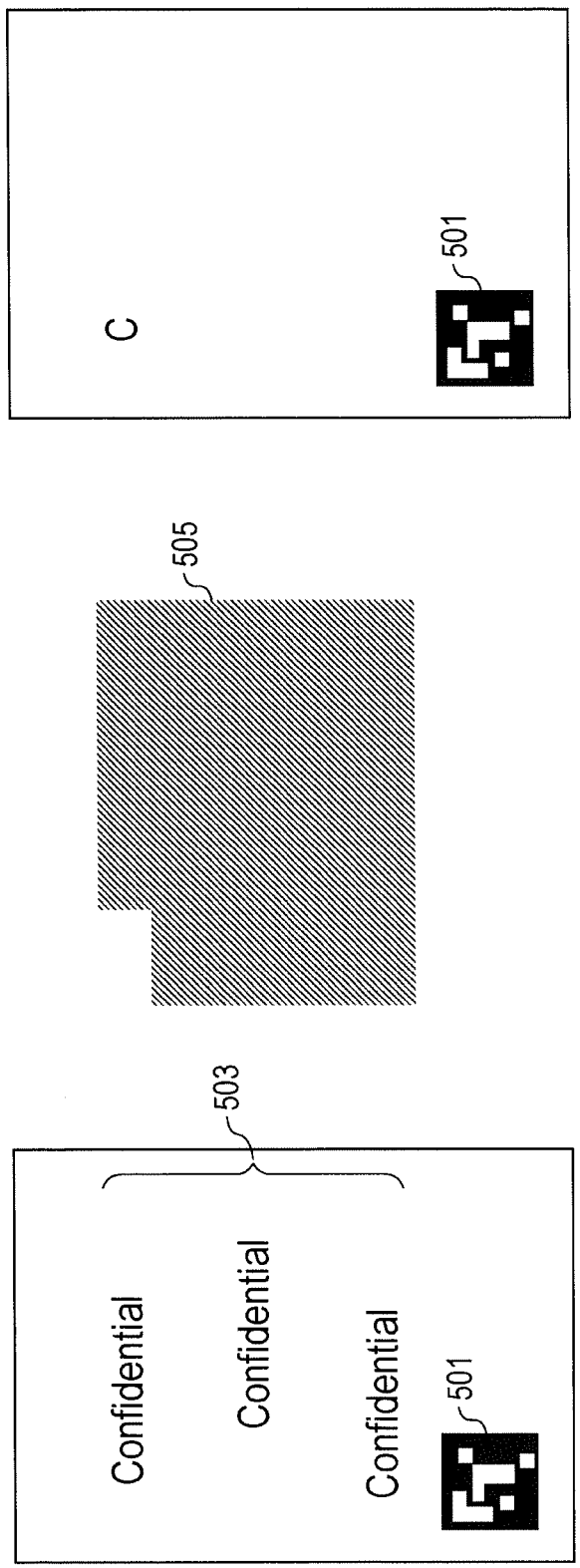

CONTENT MANAGEMENT SYSTEM, CONTENT MANAGEMENT METHOD, AND RECORDING MEDIUM

CROSS-REFERENCE TO RELATED APPLICATIONS

The entire disclosure of Japanese patent Application No. 2017-090209, filed on Apr. 28, 2017, is incorporated herein by reference in its entirety.

BACKGROUND

Technical Field

The present invention relates to a content management system, a content management method, and a content management program, and in particular, to a content management system that manages content formed on a recording medium as an image, a content management method executed in the content management system, and a content management program.

Description of the Related Art

As a technique for managing discarding of confidential documents, JP 2008-118493 A discloses a document discarding certification device that is used by being provided in any of a document generation device that generates a document, a document discarding device that discards the document, and a server device that is connected to these devices, the document discarding certification device being provided with: a generation information obtaining means that obtains, as document existence certification information, information about document generation in the document generation device; a discarding information obtaining means that obtains, as document discarding certification information, information about document discarding in the document discarding device; and an information management means that holds and manages the document existence certification information and the document discarding certification information associated with each other for the same document, wherein the document existence certification information and the document discarding certification information both include digital certification information.

However, the document discarding certification device disclosed in JP 2008-118493 A requires a function of giving a document ID to the document generated by the document generation device, and a function of causing the document discarding device to read an image from a document to be discarded. Therefore, during a time period after an image is read from a sheet of paper, on which a document to be discarded is formed, by using the function of causing the document discarding device to read an image from the document to be discarded, until the sheet of paper is discarded, if the sheet of paper is replaced, the document will be managed as having been discarded although a different document has been discarded. In addition, it is also considered that the document discarding device performs a step of discarding the sheet of paper, and a step of reading an image from the sheet of paper, thereby preventing the sheet of paper from being replaced. However, in this case, the document discarding device must be provided with the function of reading an image of the document, and the function of discarding the document, and consequently costs of the device increase.

SUMMARY

One or more embodiments of the present invention provide a content management method, a content management program, and a content management system, each being capable of checking, with high reliability, that an image of content formed on a recording medium has been erased.

According to one or more embodiments of the present invention, there is provided a content management method executed in a content management system, the content management system comprising: an image forming device that fixedly forms information on a recording medium as an image; and an image capturing device that image-captures an object, and outputs image data including an image of the object, and the content management method according to one or more embodiments of the present invention comprises: associating the content with erasure completion information indicating that the content has been erased; controlling the image forming device to form an image of the content, and an image at the time of formation related to the erasure completion information, on the recording medium; in a case where an erasure image is formed on the recording medium so as to be superimposed on at least a part of the image of the content formed on the recording medium, controlling the image forming device to form an image at the time of discarding related to the erasure completion information associated with the content, and the erasure image, on the recording medium; and in a case where the erasure completion information is identified by the image at the time of formation and the image at the time of discarding that are included in single image data output when the image capturing device image-captures the recording medium as an object, determining that the content associated with the erasure completion information has been erased.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a drawing illustrating, as an example, a format of a content record according to one or more embodiments of the present invention;

FIG. 8 is a drawing illustrating, as an example, a format of a generation record according to one or more embodiments of the present invention;

FIGS. 18A to 18C are drawings illustrating, as examples, an image at the time of formation, an erasure image, and a disposal image respectively according to one or more embodiments of the present invention.

DETAILED DESCRIPTION OF EMBODIMENTS

Figure 1:
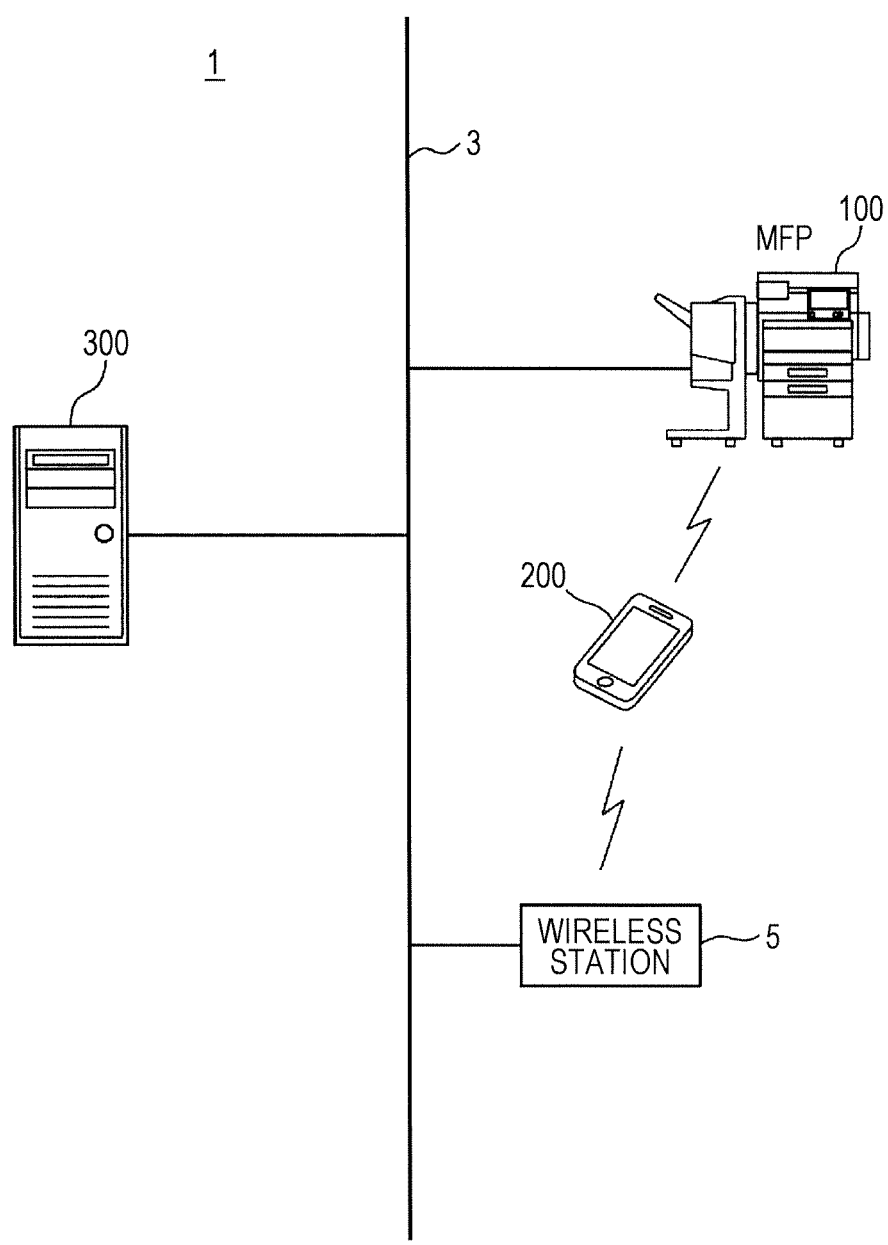
FIG. 1 is a diagram illustrating, as an example, an overall outline of a content management system according to one or more embodiments of the present invention.

Hereinafter, embodiments of the present invention will be described with reference to the drawings. However, the scope of the invention is not limited to the disclosed embodiments. In the following description, identical reference numerals are used to denote identical parts. The same applies to the names and functions thereof. Therefore, the detailed explanation thereof will not be repeated.

FIG. 1 is a diagram illustrating, as an example, an overall outline of a content management system according to one or more embodiments of the present invention. Referring to FIG. 1, a content management system 1 includes a Multi Function Peripheral (MFP) 100, a smart phone 200, and a server 300.

The server 300 is a general-purpose computer. The MFP 100 is an example of an image forming device, and has at least an image forming function of forming an image on a recording media such as a sheet of paper on the basis of image data. In addition to the image forming function, the MFP 100 may have an original document reading function of reading an original document, and a facsimile transmitting/receiving function of transmitting/receiving facsimile data. The smart phone 200 is an example of a portable information device, and is carried and used by a user.

A wireless station 5 and the MFP 100 are connected to a network 3. The network 3 is a Local Area Network (LAN), and cable or wireless does not matter as a connection mode thereof. In addition, the network 3 is not limited to the LAN. The network 3 may be a network or the like that uses Public Switched Telephone Networks (PSTN). Moreover, the network 3 may be a Wide Area Network (WAN) such as the Internet.

The smart phone 200 has a wireless LAN function, and is capable of communicating with the wireless station 5. The wireless station 5 is a repeater of the network 3, and communicates with the smart phone 200 having a communication function that uses a wireless LAN, thereby connecting the smart phone 200 to the network 3. Therefore, the smart phone 200 is capable of communicating with the MFP 100 through the wireless station 5. The network 3 may be further connected to the Internet. In this case, the smart phone 200 and the MFP 100 are both capable of communicating with a computer that is connected to the Internet through the network 3.

In the content management system 1 according to one or more embodiments of the present invention, the server 300 manages content, and the MFP 100 forms an image of the content on a sheet of paper. When content is managed, whether or not an image of content to be managed has been formed on a sheet of paper is recorded. In a case where the content has been formed on a sheet of paper, whether or not the image of the content formed on the sheet of paper has been discarded is recorded. In one or more embodiments of the present invention, the server 300 causes the MFP 100 to execute a print job for forming the image of the content on the sheet of paper, and consequently the MFP 100 forms the image of the content on the sheet of paper. After the print job has been executed by the MFP 100, the server 300 manages the content as a state in which the image of the content has been formed. In addition, the server 300 causes the MFP 100 to execute a print job for forming an erasure image on the sheet of paper, and consequently the MFP 100 forms the erasure image on the sheet of paper on which the image of the content has been formed. The erasure image is an image that is formed on a sheet of paper so as to be superimposed on the image of the content formed on the sheet of paper. If the erasure image is formed in a superimposed manner, the image of the content is brought into an undecryptable state. The state in which the image of the content cannot be decrypted is the same as a state in which the image of the content has been discarded. Although a color of the erasure image is not limited, a color of the erasure image is the same as a color of the sheet of paper that is a recording medium according to one or more embodiments of the present invention.

Figure 2:
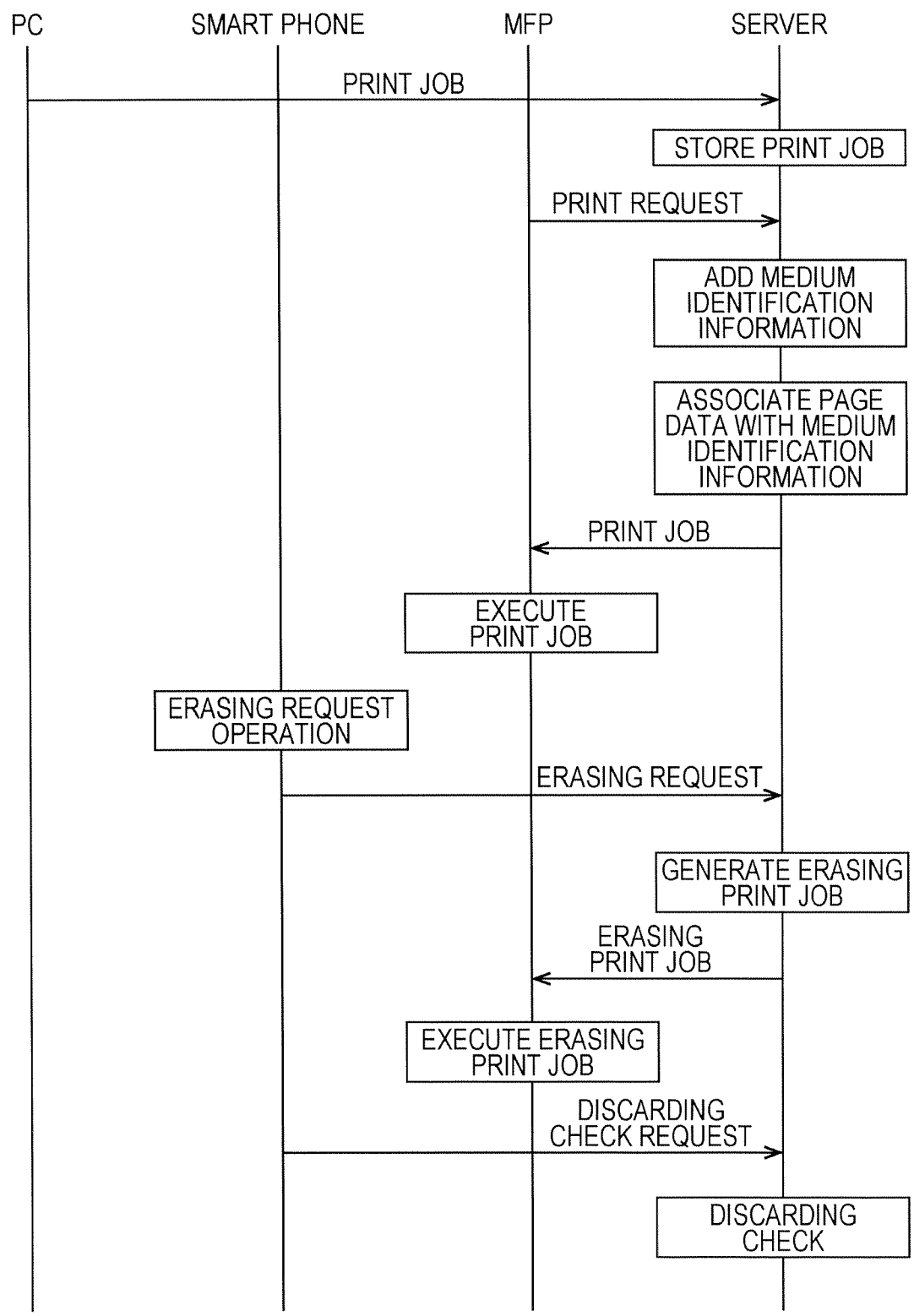
FIG. 2 is a drawing illustrating a change in state of content in one or more embodiments of the present invention.

FIG. 2 is a drawing illustrating a change in state of content in one or more embodiments of the present invention. In FIG. 2, a flow of time is indicated along each vertical axis from the top toward the bottom, and a series of processing in a PC, the smart phone 200, the MFP 100, and the server 300 that are operated by users are indicated along the vertical axes respectively. In addition, arrows shown in the figure each indicate transmitted/received data.

Referring to FIG. 2, first of all, a print job is stored in the server 300. For example, in a case where content is generated in a personal computer (hereinafter referred to as "PC") connected to the network 3, a print job for causing the PC to form an image of the content is transmitted to the server 300. When a user who operates the PC inputs an instruction to print the content into the PC, a print job for causing the PC to form an image of the content is transmitted to the server 300. When the server 300 receives the print job from the PC, the server 300 stores the print job. The print job is a job for forming an image of the content, and includes print data corresponding to the image of the content. In a case where the content is composed of a plurality of pages, the print data is composed of a plurality of pieces of page data corresponding to the plurality of pages respectively.

When the server 300 receives a print request from the MFP 100, the server 300 transmits a print job to the MFP 100. For example, when the server 300 stores the print job, in a case where the server 300 can identify a user who has instructed the generation of the print job, the server 300 stores the user with the user associated with the print job. In addition, in a case where the user logs in the MFP 100, the MFP 100 requests the server 300 to transmit the print job that is associated with the user who has logged in. The server 300 transmits the print job that has been requested from the MFP 100 to the MFP 100.

When the server 300 transmits the print job to the MFP 100, the server 300 issues medium identification information used to identify a sheet of paper, and erasure completion information, and associates the content with the medium identification information and the erasure completion information. In a case where the content is composed of a plurality of pages, the medium identification information and the erasure completion information are issued for the plurality of pages, and the medium identification information and the erasure completion information are associated with the plurality of pages of the content respectively. The erasure completion information is information indicating that when a sheet of paper is discarded, pages of the content formed on the sheet of paper have been erased. The erasure completion information is associated with a set of an image at the time of formation and an image at the time of discarding. The image at the time of formation and the image at the time of discarding are images related to the erasure completion information. By combining the image at the time of formation with the image at the time of discarding, an image indicating the erasure completion information is completed. Here, the image indicating the erasure completion information is a two-dimensional bar code.

In addition, the server 300 adds an image of the medium identification information and the image at the time of formation to a print job to be transmitted according to the print request received from the MFP 100. The image at the time of formation is an image related to the erasure completion information. Here, the image at the time of formation is an image of the two-dimensional bar code indicating the erasure completion information, and an image having a first color. For each of the plurality of pieces of page data included in the print job, the server 300 synthesizes the image indicating the medium identification information and the image at the time of formation, which have been issued for the piece of page data, thereby adding the image of the medium identification information and the image at the time of formation to the print job.

When the MFP 100 receives the print job from the server 300, the MFP 100 executes the print job. The MFP 100 executes the print job, and consequently images of the plurality of pieces of page data included in the print job are formed on a plurality of sheets of paper respectively. With respect to the page data, the image indicating the medium identification information and the image at the time of formation are synthesized in the image of the page of the content. Therefore, the image of the page of the content, the image indicating the medium identification information, and the image at the time of formation are formed in an image formed on a sheet of paper. The processing of forming the image on the sheet of paper by the MFP 100 is processing of causing the image to be fixedly recorded on the sheet of paper by using a toner.

When a user who obtains a sheet of paper on which an image of content has been formed by the MFP 100 discards the sheet of paper on which the image of the content has been formed, the user registers, in the server 300, information indicating that the sheet of paper has been discarded. Operation of registering, in the server 300, the information indicating that the sheet of paper has been discarded includes discarding request operation of requesting the server 300 to discard the sheet of paper, and discarding check operation of causing the server 300 to check discarding.

The discarding request operation is user's operation of inputting into the smart phone 200. The user operates the smart phone 200 to input, into the smart phone 200, operation of specifying a sheet of paper to be discarded and a device that discards the sheet of paper. More specifically, in a case where the device that discards the sheet of paper is the MFP 100, the discarding request operation by the user includes: operation of setting the sheet of paper, on which the image of the content has been formed, in a paper feed tray with which a feeder 150 of the MFP 100 is provided; operation of image-capturing a sheet of paper by a camera 209 (example of an image capturing device) of the smart phone 200; and operation of specifying the MFP 100 by the smart phone 200. The smart phone 200 transmits, to the server 300, an erasing request including: image data that is obtained by image-capturing by a camera, and that is output by the camera; and device identification information of the MFP 100 specified by the user.

In a case where the server 300 receives an erasing request from the smart phone 200, the server 300 identifies the medium identification information from the image data included in the erasing request, and identifies content associated with the medium identification information. Moreover, the server 300 generates an erasure image used to make the content unreadable. Subsequently, the server 300 determines an image at the time of discarding related to the erasure completion information associated with the medium identification information, and generates an erasing print job for forming the erasure image and the image at the time of discarding on a sheet of paper. The image at the time of discarding is an image of a two-dimensional bar code indicating the erasure completion information, and is an image having a second color.

It should be noted that the discarding request operation may be performed for the MFP 100. In this case, the discarding request operation is operation of setting, in the MFP 100, the sheet of paper on which the image of the content has been formed, and operation of specifying content to be discarded. In a case where the MFP 100 accepts the operation of specifying the content to be discarded, the MFP 100 transmits, to the server 300, an erasing request that includes the content identification information used to identify the content. In a case where the server 300 receives the erasing request from the MFP 100, the server 300 identifies the content from the content identification information included in the erasing request, and generates an erasure image used to make the content unreadable. Subsequently, the server 300 determines an image at the time of discarding associated with the content, and generates an erasing print job for forming the erasure image and the image at the time of discarding on a sheet of paper.

The erasing print job is a job for forming an erasure image at a position at which the erasure image is superimposed on the image of the content formed on the sheet of paper, and for forming the image at the time of discarding, which has the second color and is associated with the content, in such a manner that the image at the time of discarding is superimposed on the image at the time of formation. In addition, in order to cause the MFP 100 to execute the erasing print job, the server 300 transmits the erasing print job to the MFP 100.

When the MFP 100 receives the erasing print job from the server 300, the MFP 100 executes the erasing print job. The MFP 100 executes the erasing print job, and consequently the erasure image and the image at the time of discarding are formed on the sheet of paper which is set in the feeder of the MFP 100, and on which the image of the content has been formed. Page data included in the erasing print job includes the erasure image and the image at the time of discarding. Therefore, the erasure image is formed so as to be superimposed on the image of the content formed on the sheet of paper, and the image at the time of discarding is formed so as to be superimposed on the image at the time of formation formed on the sheet of paper. The image at the time of discarding having the second color is formed so as to be superimposed on the image at the time of formation having the first color. Therefore, the image at the time of discarding has a third color.

Subsequently, the user performs discarding check operation. Here, as the discarding check operation, the user operates the smart phone 200 to image-capture the sheet of paper to be discarded. The smart phone 200 transmits a discarding check request including image data that is obtained by image-capturing by a camera, and that is output by the camera, to the server 300. On receipt of the discarding check request, the server 300 identifies an image indicating medium identification information included in image data included in the discarding check request, and the image at the time of discarding having the third color, and identifies the medium identification information and the erasure completion information. The third color is a color determined from the first color of the image at the time of formation, and the second color of the image at the time of discarding. The medium identification information is identified from the image indicating the medium identification information, and erasure identification information is identified from the image at the time of discarding having the third color. In addition, in a case where the medium identification information and the erasure completion information are associated with the same content identification information, it is checked that the image of the content identified by the content identification information has been brought into an undecryptable state. Subsequently, the content is associated with the undecryptable state.

After the formation of the erasure image by the MFP 100, it is determined that the content is in an undecryptable state. Therefore, in a case where inaction has occurred, for example, if the sheet of paper has been replaced, during a time period from before the formation of the erasure image until the formation of the erasure image, the image indicating the medium identification information and the image indicating the erasure completion information are not formed on the same sheet of paper. Therefore, even in a case where an inappropriate action such as replacement of the sheet of paper occurs during a time period from before the formation of the erasure image until the formation of the erasure image, the image of the content can be prevented from being determined to be in an undecryptable state. Moreover, by forming the image at the time of discarding having the second color so as to be superimposed on the image at the time of formation having the first color, the image at the time of discarding having the third color is formed on the sheet of paper. Therefore, work of forming the image at the time of discarding having the third color on the sheet of paper becomes difficult, which enables to prevent falsification.

Figure 3:
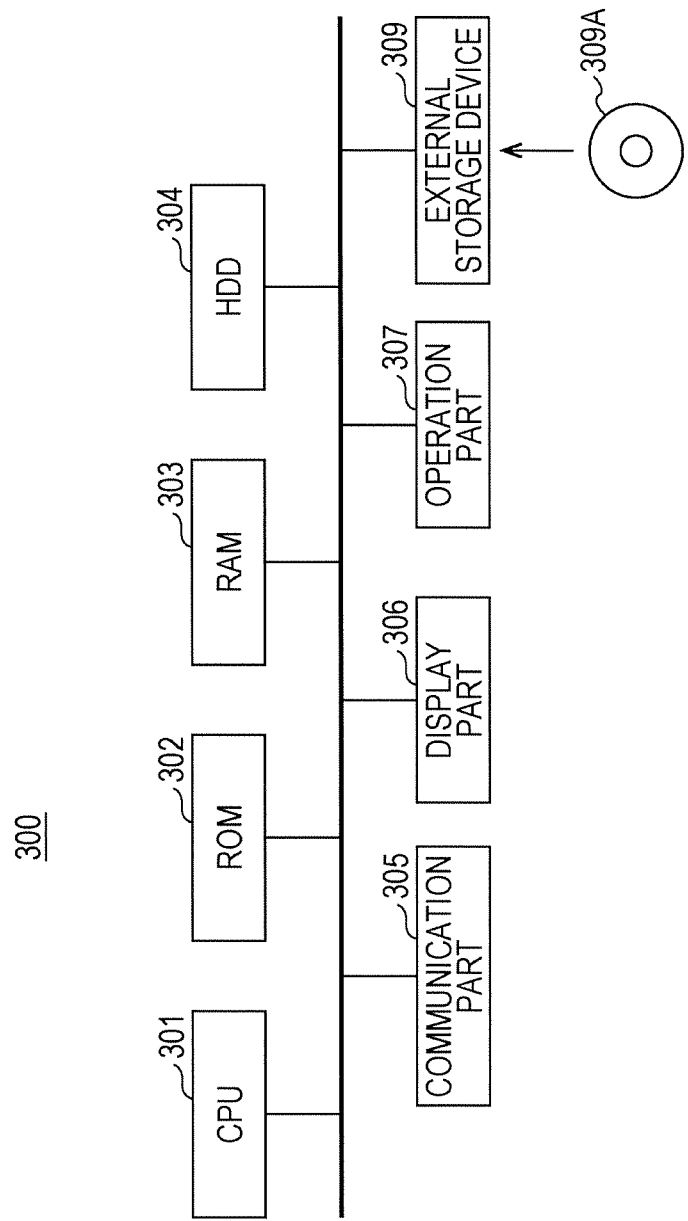
FIG. 3 is a block diagram illustrating, as an example, an outline of a hardware configuration of a server according to one or more embodiments of the present invention.

FIG. 3 is a block diagram illustrating, as an example, an outline of a hardware configuration of the server according to one or more embodiments of the present invention. Referring to FIG. 3, the server 300 includes: a CPU 301 that controls the server 300 as a whole; a Read Only Memory (ROM) 302 that stores a program executed by the CPU 301; a Random Access Memory (RAM) 303 used as a work area of the CPU 301; a Hard Disk Drive (HDD) 304 that stores data in a nonvolatile manner; a communication part 305 that connects the CPU 301 to the network 3; a display part 306 that displays information; an operation part 307 that accepts input of the operation by the user; and an external storage device 309.

A Compact Disk ROM (CD-ROM) 309A is mounted in the external storage device 309. The CPU 301 is capable of accessing the CD-ROM 309A through the external storage device 309. The CPU 301 loads, into the RAM 303, a program that is recorded on the CD-ROM 309A mounted in the external storage device 309, and then executes the program. It should be noted that a medium that stores the program executed by the CPU 301 is not limited to the CD-ROM 309A, but may be a semiconductor memory such as an optical disk (MO (Magnetic Optical Disc/MD (Mini Disc)/DVD (Digital Versatile Disc)), an IC card, an optical card, a mask ROM or an EPROM (Erasable Programmable ROM).

In addition, the program executed by the CPU 301 is not limited to the program recorded on the CD-ROM 309A. A program stored in the HDD 304 may be loaded into the RAM 303 so as to be executed. In this case, another computer that is connected to the network 3 may rewrite the program stored in the HDD 304 of the server 300. Alternatively, another computer that is connected to the network 3 may additionally write a new program. Moreover, the server 300 may download a program from another computer that is connected to the Internet, and may store the program in the HDD 304. The program described here includes not only a program that can be directly executed by the CPU 301, but also a source program, a compressed program, and an encrypted program.

Figure 4:
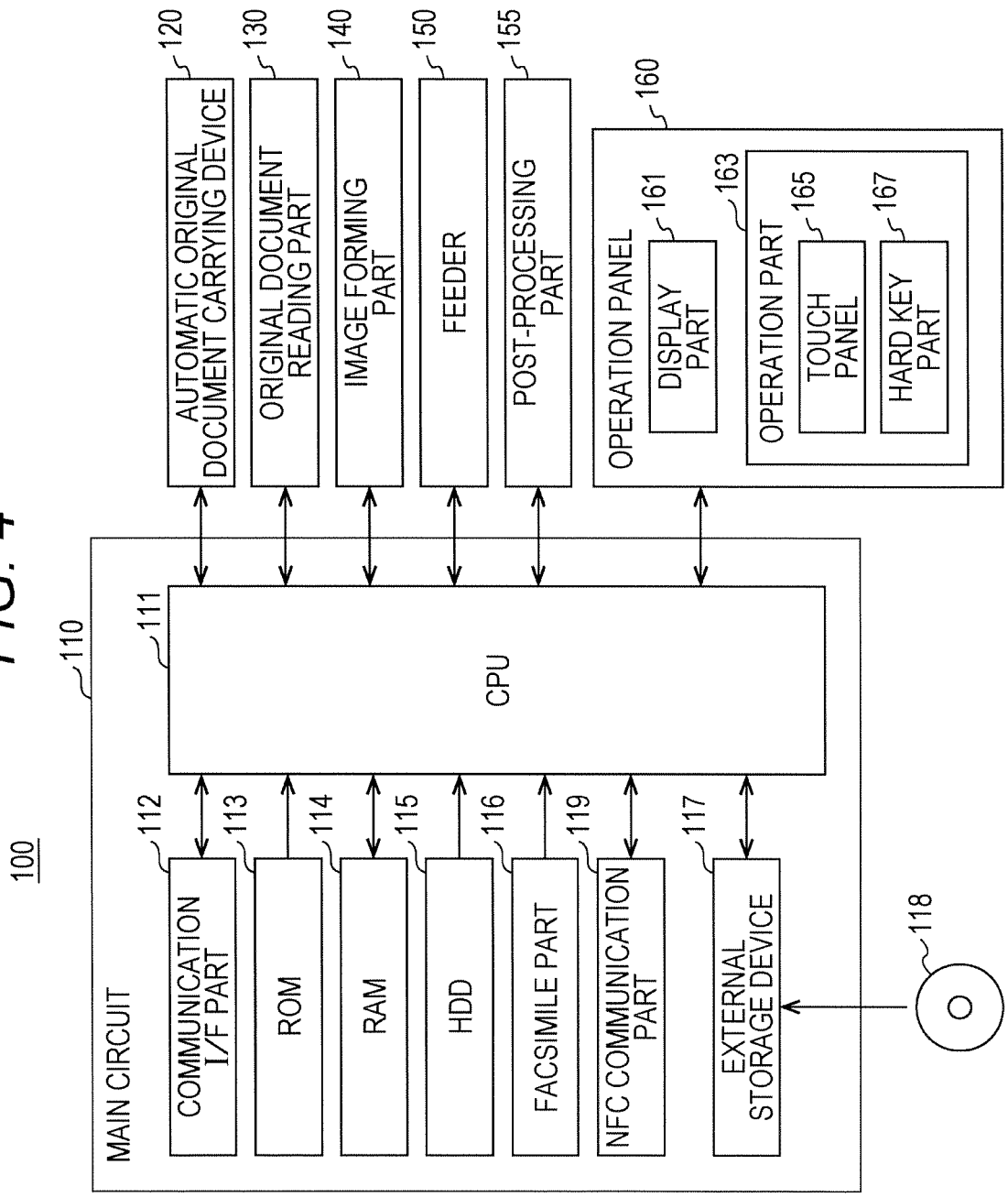
FIG. 4 is a block diagram illustrating, as an example, a hardware configuration of a MFP according to one or more embodiments of the present invention.

FIG. 4 is a block diagram illustrating, as an example, a hardware configuration of the MFP according to one or more embodiments of the present invention. Referring to FIG. 4, the MFP 100 includes: a main circuit 110; an original document reading part 130 that reads an original document; an automatic original document carrying device 120 that carries the original document to the original document reading part 130; an image forming part 140 that forms an image on a sheet of paper, or the like, on the basis of image data that is obtained by reading the original document by the original document reading part 130, and is then output; a feeder 150 that supplies a sheet of paper to the image forming part 140; a post-processing part 155 that processes a sheet of paper on which an image has been formed; and an operation panel 160 as a user interface.

The automatic original document carrying device 120 automatically carries a plurality of original documents, which are set on an original document tray, one by one to a predetermined original document reading position set on platen glass of the original document reading part 130, and discharges, to an original document paper discharge tray, an original document from which a formed image has been read by the original document reading part 130. The original document reading part 130 includes: a light source that irradiates an original document carried to the original document reading position with light; and a photoelectric conversion element that receives light reflected by the original document. The original document reading part 130 scans an original document image corresponding to the size of the original document. The photoelectric conversion element converts the received light into image data that is an electric signal, and then outputs the image data to the image forming part 140.

The feeder 150 carries a sheet of paper stored in the paper feed tray to the image forming part 140. The image forming part 140 forms an image by a well-known electrophotographic method. The image forming part 140 forms an image on a sheet of paper carried by the feeder 150 on the basis of image data after data processing, in which image data input from the original document reading part 130 is subjected to various data processing such as shading correction, or on the basis of image data received from the outside, and discharges, to the paper discharge tray, the sheet of paper on which the image has been formed.

The post-processing part 155 executes: sort processing of sorting one or more sheets of paper on which an image has been formed by the image forming part 140, and then discharging the sheets of paper; punch processing of processing a punched hole; and staple processing of driving a staple needle.

The main circuit 110 includes: a CPU 111; a communication interface (I/F) part 112 that is connected to the CPU 111; a ROM 113; a RAM 114; a HDD 115; a facsimile part 116; and an external storage device 117. The CPU 111 is connected to the automatic original document carrying device 120, the original document reading part 130, the image forming part 140, the feeder 150, the post-processing part 155, and the operation panel 160, and controls the MFP 100 as a whole.

The ROM 113 stores a program executed by the CPU 111, or data required to execute the program. The RAM 114 is used as a work area when the CPU 111 executes a program. In addition, the RAM 114 temporarily stores read data (image data) that is consecutively transmitted from the original document reading part 130.

The operation panel 160 is provided on the upper surface of the MFP 100, and includes a display part 161 and an operation part 163. The display part 161 is a display device such as a liquid crystal display device (LCD), an organic ELD (Electro-Luminescence Display), and displays, for example, an instruction menu for a user, information about obtained image data. The operation part 163 is provided with a hard key part 167 composed of a plurality of keys, and accepts various kinds of instructions, and input of data such as characters and numbers, made by user's operation corresponding to the keys. The operation part 163 further includes a touch panel 165 provided on the display part 161.

The HDD 115 is a large capacity storage. The communication I/F part 112 is an interface for connecting the MFP 100 to the network 3. The CPU 111 communicates with the smart phone 200 through the communication I/F part 112, and transmits/receives data. In addition, the communication I/F part 112 enables communication with the computer that is connected to the Internet through the network 3.

The facsimile part 116 is connected to a Public Switched Telephone Network (PSTN), and transmits facsimile data to the PSTN, or receives facsimile data from the PSTN. The facsimile part 116 stores the received facsimile data in the HDD 115, or outputs the received facsimile data to the image forming part 140. The image forming part 140 prints, on a sheet of paper, the facsimile data received by the facsimile part 116. In addition, the facsimile part 116 converts data stored in the HDD 115 into facsimile data, and then transmits the facsimile data to a facsimile device connected to the PSTN.

A CD-ROM 118 is mounted in the external storage device 117. The CPU 111 is capable of accessing the CD-ROM 118 through the external storage device 117. The CPU 111 loads, into the RAM 114, a program that is recorded on the CD-ROM 118 mounted in the external storage device 117, and then executes the program. It should be noted that a medium for storing a program executed by the CPU 111 is not limited to the CD-ROM 118, but may be an optical disk or a semiconductor memory.

In addition, the program executed by the CPU 111 is not limited to the program recorded on the CD-ROM 118. A program stored in the HDD 115 may be loaded into the RAM 114 so as to be executed. In this case, another computer that is connected to the network 3 may rewrite the program stored in the HDD 115 of the MFP 100. Alternatively, another computer that is connected to the network 3 may additionally write a new program. Moreover, the MFP 100 may download a program from another computer that is connected to the network 3, and may store the program in the HDD 115. The program described here includes not only a program that can be directly executed by the CPU 111, but also a source program, a compressed program, and an encrypted program.

Figure 5:
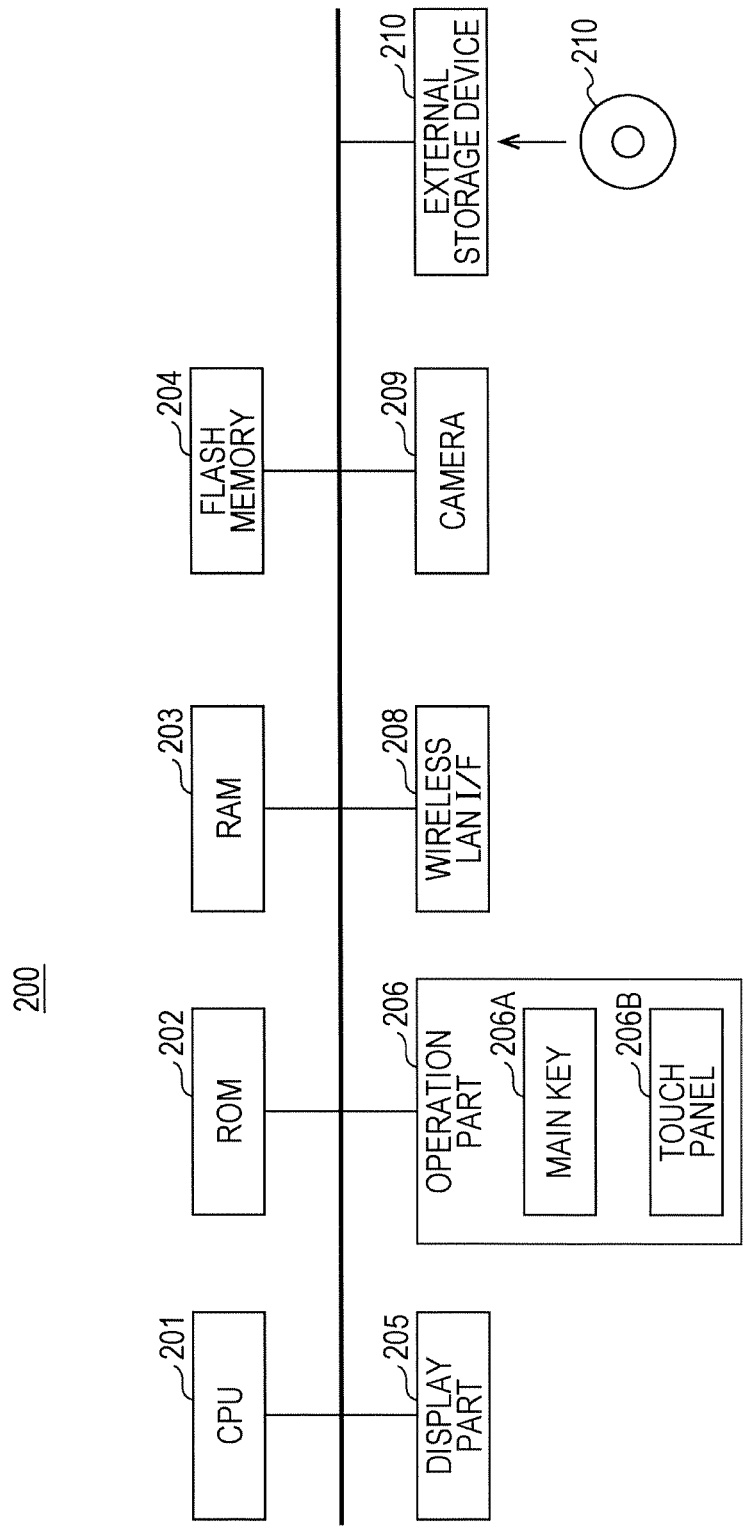
FIG. 5 is a block diagram illustrating, as an example, an outline of a hardware configuration of a smart phone according to one or more embodiments of the present invention.

FIG. 5 is a block diagram illustrating, as an example, an outline of a hardware configuration of the smart phone 200 according to one or more embodiments of the present invention. Referring to FIG. 5, the smart phone 200 according to one or more embodiments of the present invention includes: a CPU 201 that controls the smart phone 200 as a whole; a ROM 202 that stores a program or the like executed by the CPU 201; a RAM 203 used as a work area of the CPU 201; a flash memory 204 that stores data in a nonvolatile manner; a display part 205 that displays information; an operation part 206 that accepts user's operation; a wireless LAN interface (I/F) 208; the camera 209; and an external storage device 210.

The flash memory 204 stores a program executed by the CPU 201, or data required to execute the program. The CPU 201 loads a program recorded in the flash memory 204 into the RAM 203, and then executes the program.

The display part 205 is a Liquid Crystal Display (LCD) device, an organic ELD or the like. The operation part 206 is provided with a main key 206A, and a touch panel 206B. The touch panel 206B is provided on the upper or lower surface of the display part 205 so as to be superimposed on the display part 205. The main key 206A is, for example, a hard key that includes a contact switch. The touch panel 206B uses a capacitive sensing method. It should be noted that a method used by the touch panel 206B is not limited to the capacitive sensing method, and thus the touch panel 206B may use another method such as a resistive film method, a surface acoustic wave method, an infrared ray method or an electromagnetic induction method. The touch panel 206B detects a position instructed by a user on a display surface of the display part 205. In addition, in a case where the user instructs a position on the display surface of the display part 205, the operation part 206 outputs, to the CPU 201, the position on the display surface detected by the touch panel 206B.

On the basis of the position detected by the touch panel 206B, the CPU 201 detects a position instructed by the user in a screen displayed on the display part 205. On the basis of the screen displayed on the display part 205 and the position detected by the touch panel 206B, the CPU 201 accepts various kinds of instructions, and input of data such as characters and numbers, made by user's operation. For example, in a case where a screen including an image of a numeric keypad is displayed on the display part 205, the CPU 201 accepts a number corresponding to a key displayed at a position detected by the touch panel 206B.

The wireless LAN I/F 208 is an interface for communicating with the wireless station 5 to connect the smart phone 200 to the network 3. Registering an Internet Protocol (IP) address of the MFP 100 in the smart phone 200 enables the smart phone 200 to communicate with the MFP 100, and consequently to transmit/receive data. Incidentally, one or more embodiments of the present invention take, as an example, a case where the smart phone 200 uses the wireless LAN I/F 208 to communicate with the MFP 100. However, the smart phone 200 may communicate with the MFP 100 by using others communication methods. More specifically, in a case where the smart phone 200 is equipped with, for example, a short-distance wireless device such as Bluetooth (registered trademark), the smart phone 200 may communicate one-to-one with the MFP 100.

The camera 209 is provided with a lens and a photoelectric conversion element. The camera 209 forms an image of light concentrated by the lens on the photoelectric conversion element. The photoelectric conversion element photoelectrically converts received light, and outputs image data to the CPU 201. The photoelectric conversion element is a Complementary Metal Oxide Semiconductor (CMOS) sensor, a Charge Coupled Device (CCD) sensor or the like.

The external storage device 210 is attachable and detachable to the smart phone 200. A CD-ROM 210A that stores a program can be mounted in the external storage device 210. The CPU 201 is capable of accessing the CD-ROM 210A through the external storage device 210. The CPU 201 is capable of loading, into the RAM 203, a program that is recorded on the CD-ROM 210A mounted in the external storage device 210, and then executing the program.

Incidentally, the program recorded in the ROM 202, the flash memory 204 or the CD-ROM 210A has been explained as a program executed by the CPU 201. However, a program executed by the CPU 201 may be a program obtained by rewriting the program stored in the flash memory 204 by another computer connected to the network 3 or the Internet, or may be a new program that is additionally written. Moreover, a program executed by the CPU 201 may be a program that is downloaded, by the smart phone 200, from another computer connected to the network 3 or the Internet. The program described here includes not only a program that can be directly executed by the CPU 201, but also a source program, a compressed program, and an encrypted program.

It should be noted that a medium for storing a program executed by the CPU 201 is not limited to the CD-ROM 210A, but may be an optical disk, an IC card, an optical card, or a semiconductor memory.

Figure 6:
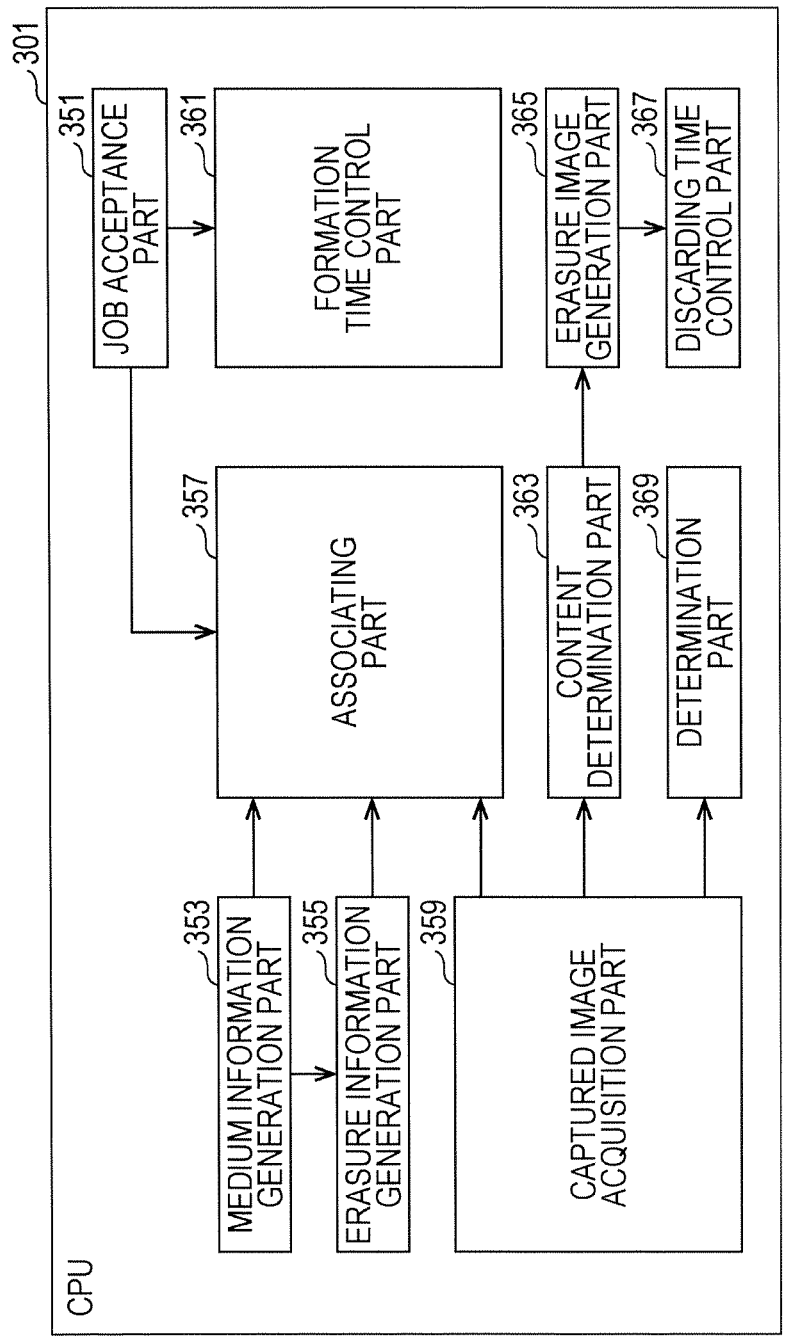
FIG. 6 is a block diagram illustrating, as an example, a function of a CPU provided in the server according to one or more embodiments of the present invention.

FIG. 6 is a block diagram illustrating, as an example, a function of the CPU provided in the server according to one or more embodiments of the present invention. Functions shown in FIG. 6 are realized by the CPU 301 when the CPU 301 provided in the server 300 executes a content management program stored in the ROM 302, the HDD 304 or the CD-ROM 309A.

Referring to FIG. 6, the CPU 301 provided in the server 300 includes a job acceptance part 351, a medium information generation part 353, an erasure information generation part 355, an associating part 357, a captured image acquisition part 359, a formation time control part 361, a content determination part 363, an erasure image generation part 365, a discarding time control part 367, and a determination part 369.

The job acceptance part 351 accepts a print job for forming an image of content on a sheet of paper. In a case where the content is composed of a plurality of pages, the print job includes a plurality of pieces of page data corresponding to the plurality of pages respectively. The job acceptance part 351 controls the communication part 305 to receive a print job from the PC connected to the network 3, thereby accepting the print job. In a case where the job acceptance part 351 accepts a print job, the job acceptance part 351 stores the print job in the HDD 304. The job acceptance part 351 may store the print job in the HDD 304 with the print job associated with information that identifies a user who instructs the execution of the print job received from the PC. The job acceptance part 351 may store the print job in the HDD 304 with the print job associated with, for example, user identification information of a user who operates the PC. In addition, in a stage in which the PC generates a print job, the user who operates the PC may include, in the print job, user identification information of a user specified as a destination.

In a case where a print job is accepted by the job acceptance part 351, the associating part 357 associates the content with the medium identification information and the erasure completion information. For each of a plurality of pages included in the content, the associating part 357 requests the medium information generation part 353 to generate medium identification information, and requests the erasure information generation part 355 to generate erasure completion information.

In response to the request from the associating part 357 to generate medium identification information, the medium information generation part 353 generates the medium identification information, and outputs the medium identification information to the associating part 357 and the erasure information generation part 355. The medium identification information is information used to identify a sheet of paper on which an image of the content is to be formed. The medium identification information is a sequence of letters or numbers.

In response to the request from the associating part 357 to generate erasure completion information, the erasure information generation part 355 generates the erasure completion information, and outputs the erasure completion information to the associating part 357. The erasure completion information is a sequence of letters or numbers. The erasure information generation part 355 generates erasure completion information corresponding to medium identification information input from the medium information generation part 353. In other words, one piece of erasure completion information is generated for one piece of medium identification information.

The associating part 357 associates the content identification information with the medium identification information input from the medium information generation part 353 and the erasure completion information input from the erasure information generation part 355. Pieces of content identification information used to identify respective pieces of print data corresponding to the respective plurality of pages included in the print job are associated with respective pieces of medium identification information generated for the pieces of content identification information by the medium information generation part 353, and respective pieces of erasure completion information generated for the pieces of content identification information by the erasure information generation part 355. More specifically, the associating part 357 generates a content record that includes the content identification information, the medium identification information, and the erasure completion information, and then stores the content record in the HDD 304.

Moreover, the associating part 357 generates generation information corresponding to the erasure completion information, and associates the generation information with the erasure completion information. The associating part 357 generates a generation record that includes the erasure completion information and the generation information, and then stores the generation record in the HDD 304. The generation information includes an image at the time of formation, the first color, an image position, an image at the time of discarding, the second color, and a relative position. The image at the time of formation and the image at the time of discarding are images each having the same shape as that of an image related to the erasure completion information. Here, an image that represents the erasure completion information by a two-dimensional bar code is used as the image related to the erasure completion information. The first color is a color given to the image at the time of formation, and the second color is a color given to the image at the time of discarding. Therefore, the image at the time of formation and the image at the time of discarding have the same shape, but differ in color. The image position indicates a position in the sheet of paper on which the image at the time of formation is formed. The image position is indicated by a reference point of the sheet of paper, for example, by a distance in the horizontal direction (X-axis direction) and a distance in the vertical direction (Y-axis direction) from the upper left vertex angle. The relative position indicates a relative position of the image at the time of discarding relative to the image at the time of formation. The relative position is represented by a distance in the horizontal direction (X-axis direction) and a distance in the vertical direction (Y-axis direction) from the image at the time of formation. Here, in order to form the image at the time of discarding at the same position as that of the image at the time of formation, the distance in the horizontal direction (X-axis direction) and the distance in the vertical direction (Y-axis direction) are both set at 0 as the relative position in the generation information.

FIG. 7 is a drawing illustrating, as an example, a format of the content record. Referring to FIG. 7, the content record includes a content identification information field, a medium identification information field, an erasure completion information field, and a discarding field. Content identification information is set in the content identification information field. Medium identification information that is used to identify a sheet of paper on which an image of the content identified by the content identification information is formed is set in the medium identification information field. Erasure completion information indicating that the image of the content identified by the content identification information has been discarded is set in the erasure completion information field. A discard code indicating that the sheet of paper on which the image of the content identified by the content identification information has been formed has been discarded is set in the discarding field.

FIG. 8 is a drawing illustrating, as an example, a format of the generation record. Referring to FIG. 8, the generation record includes an erasure completion information field, and a generation information field. The generation information field includes an image at the time of formation field, a first color field, an image position field, an image at the time of discarding field, a second color field, and a relative position field. Erasure completion information is set in the erasure completion information field. An image at the time of formation that is an image related to the erasure completion information is set in the image at the time of formation field. A color given to the image at the time of formation is set in the first color field. Position information indicating a position in the sheet of paper on which the image at the time of formation is formed is set in the image position field. An image at the time of discarding that is an image related to the erasure completion information is set in the image at the time of discarding field. A color given to the image at the time of discarding is set in the second color field. A relative position of the image at the time of discarding relative to the image at the time of formation is set in the relative position field.

Returning to FIG. 6, in a case where the formation time control part 361 receives a job transmission request from the MFP 100, the formation time control part 361 identifies a print job from among print jobs stored in the HDD 304, the print job being identified by the transmission request. In a case where the transmission request received from the MFP 100 includes user identification information of a user who operates the MFP 100, the formation time control part 361 identifies a print job that is associated with the user identification information. In addition, a list of the print jobs stored in the HDD 304 may be transmitted to the MFP 100 so as to allow the user who operates the MFP 100 to specify a print job. In this case, the formation time control part 361 accepts a transmission request to transmit the print job specified by the user. For each of pieces of print data composed of the plurality of pages included in the print job, the formation time control part 361 synthesizes an image indicating medium identification information, and an image at the time of formation, the images being associated with the each of pieces of print data by the associating part 357. The image indicating medium identification information is an image of the medium identification information that is associated, by the associating part 357, with the content identification information used to identify print data. Here, the image indicating medium identification information is a two-dimensional bar code that indicates the medium identification information.

The image at the time of formation is an image that relates to the erasure completion information, and that is associated, by the associating part 357, with the content identification information used to identify print data. The image at the time of formation is determined by generation information that is associated, by the associating part 357, with the erasure completion information. The formation time control part 361 identifies generation information associated with the erasure completion information, and determines an image at the time of formation, the first color, and an image position included in the identified generation information. For each of the plurality of pieces of page data included in the print job, the formation time control part 361 identifies content identification information, and synthesizes an image at the time of formation corresponding to the content identification information with the first color at a position identified by the image position.

The formation time control part 361 transmits, to the MFP 100, a print job including the print data in which the image indicating medium identification information and the image at the time of formation are synthesized, and controls the MFP 100 to execute the print job. As the result, the print job is executed in the MFP 100, and an image of the print data included in the print job is formed on a sheet of paper. The image indicating medium identification information and the image at the time of formation are synthesized in the print data, and therefore the image indicating medium identification information and the image at the time of formation are formed on the sheet of paper.

In a case where medium identification information is formed on a sheet of paper There is a case where on a sheet of paper on which an image is formed by the MFP 100, the sheet of paper being stored in the MFP 100, an image indicating medium identification information used to identify the sheet of paper is formed beforehand. In this case, a camera or the like for reading the medium identification information formed on the sheet of paper on which the image is formed is provided in a housing of the MFP 100. In addition, every time the MFP 100 executes a print job to form an image on a sheet of paper, the MFP 100 reads the medium identification information formed on the sheet of paper by using the camera, and transmits the medium identification information, and content identification information of print data of a page formed on the sheet of paper, to the server 300. In a case where the associating part 357 receives the medium identification information and the content identification information from the MFP 100, the associating part 357 requests the erasure information generation part 355 to generate erasure completion information, and associates the medium identification information and the content identification information with the erasure completion information generated by the erasure information generation part 355.

<At the Time of Discarding>

In a case where a user who operates the smart phone 200 discards a sheet of paper on which an image of content has been formed, the user performs discarding request operation. Specifically, the user operates the smart phone 200 to input, into the smart phone 200, operation of specifying a sheet of paper to be discarded, and the MFP 100 as a device that discards the sheet of paper. More specifically, the user performs: operation of setting, in the MFP 100, the sheet of paper on which the image of the content has been formed; operation of using the camera 209 to image-capture an image indicating the medium identification information formed on the sheet of paper; and operation of specifying the MFP 100. The smart phone 200 transmits a set of image data that is obtained by image-capturing by the camera 209, and that is output by the camera 209, and the device identification information of the MFP 100 specified by the user, to the server 300.

In a case where the communication part 305 receives the set of the image data and the device identification information from the smart phone 200, the captured image acquisition part 359 outputs the image data and the device identification information, which have been received from the smart phone 200, to the content determination part 363.

In a case where the image data and the device identification information are input from the captured image acquisition part 359, the content determination part 363 extracts an image indicating medium identification information included in the image data, and identifies the medium identification information. The content determination part 363 refers to a content record stored in the HDD 304, and determines content identification information that is associated with the identified medium identification information. The content determination part 363 outputs a set of the content identification information and the device identification information to the erasure image generation part 365.

In response to input of the set of the content identification information and the device identification information from the content determination part 363, the erasure image generation part 365 identifies, from among print jobs stored in the HDD 304, a print job that includes page data identified by the content identification information. Subsequently, the erasure image generation part 365 generates an erasure image that brings, into an undecryptable state, an image of page data (content) identified by the content identification information from among pieces of print data included in the identified print job. The erasure image is an image, the position and size of which are determined with reference to an image included in the page data. The erasure image is, for example, is an image that is superimposed on an area surrounding an image included in the page data, all pixels in the area having the same color. The erasure image generation part 365 outputs a set of the content identification information, the erasure image and the device identification information to the discarding time control part 367.

The set of the content identification information, the erasure image and the device identification information is input into the discarding time control part 367 from the erasure image generation part 365. The discarding time control part 367 determines erasure completion information with reference to a content record. The discarding time control part 367 determines content identification information and erasure completion information corresponding to the erasure image. The discarding time control part 367 generates a print job that includes page data of an image in which an image at the time of discarding related to erasure completion information is synthesized into an erasure image. More specifically, the discarding time control part 367 reads a generation record that includes the erasure completion information from the HDD 304, and determines generation information included in the generation record. The discarding time control part 367 determines an image position, an image at the time of discarding, the second color, and a relative position that are determined by the generation information. The image at the time of discarding is an image corresponding to the image at the time of formation. Here, the image at the time of discarding is an image that has the same shape as that of a two-dimensional bar code indicating the erasure completion information, and that has the second color determined corresponding to the image at the time of discarding. The discarding time control part 367 generates page data for forming the image at the time of discarding and the erasure image on a recording medium. The discarding time control part 367 generates page data in such a manner that the image at the time of discarding is formed with the second color at a position determined by a relative position relative to an image position on a sheet of paper. Here, since the relative position is 0, page data for forming the image at the time of discarding with the second color at the image position on the sheet of paper is generated.

The discarding time control part 367 controls the communication part 305 to communicate with the MFP 100 identified by the device identification information, and to transmit a print job to the MFP 100 so as to cause the MFP 100 to execute the print job for forming an image into which the image at the time of discarding and the erasure image are synthesized. As the result, the print job is executed, and the erasure image and the image at the time of discarding are formed on the sheet of paper in the MFP 100. In a case where an image of the content is formed on the sheet of paper targeted for image forming, an erasure image is formed so as to be superimposed on the image of the content, and therefore the image of the content is brought into an undecryptable state.

Figure 9C:
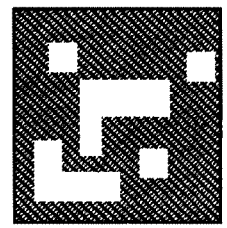
FIGS. 9A to 9C are drawings illustrating, as examples, an image at the time of formation, an image at the time of discarding, and a disposal image respectively according to one or more embodiments of the present invention.
Figure 9B:
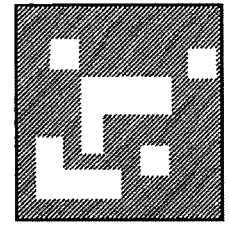
Figure 9A:
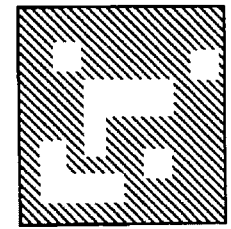

FIGS. 9A to 9C are drawings illustrating, as examples, an image at the time of formation, an image at the time of discarding, and a disposal image respectively. FIG. 9A is a first drawing illustrating an example of an image at the time of formation. The image at the time of formation has a shape of a two-dimensional bar code, and has a cyan color. The image at the time of formation is illustrated with hatching, which indicates that the color of the image at the time of formation is cyan. FIG. 9B is a first drawing illustrating an example of an image at the time of discarding. The image at the time of discarding has a shape of a two-dimensional bar code, and has a yellow color. The image at the time of discarding is illustrated with hatching, which indicates that the color of the image at the time of discarding is yellow. The image at the time of discarding and the image at the time of formation have the same shape. FIG. 9C is a drawing illustrating an example of a disposal image. The disposal image is an image that is formed by superimposing an image at the time of discarding on an image at the time of formation. The disposal image shown in FIG. 9C has the same shape as that of the image at the time of formation and that of the image at the time of discarding, and has a green color. The disposal image is illustrated with hatching, which indicates that the color of the image is green. In this manner, it is known beforehand that if an image is formed with yellow toner with the image superimposed on an image formed with cyan toner, the image appears to have a green color.

Returning to FIG. 6, after the user who operates the smart phone 200 performs discarding request operation, the user performs discarding check operation. More specifically, the user operates the smart phone 200 to input, into the smart phone 200, operation of using the camera 209 to image-capture the sheet of paper on which the erasure image has been formed, the sheet of paper being an object. The smart phone 200 transmits image data that is obtained by image-capturing by the camera 209, and that is output by the camera 209, to the server 300. In a case where the captured image acquisition part 359 receives the image data, the captured image acquisition part 359 outputs the image data received from the smart phone 200 to the determination part 369.

In a case where the image data is input from the captured image acquisition part 359, the determination part 369 extracts an image indicating medium identification information included in the image data, and identifies the medium identification information. The determination part 369 extracts, from content records stored in the HDD 304, a content record that includes medium identification information identified by the image data, and determines erasure completion information from the extracted content record. The determination part 369 extracts, from generation records stored in the HDD 304, a generation record that includes erasure completion information, and determines the first color and the second color from the extracted generation record. The determination part 369 determines the third color predetermined for a set of the first color and the second color, extracts, as a disposal image, an image having the third color from image data input from the captured image acquisition part 359, and determines whether or not the extracted disposal image agrees with an image determined by the erasure completion information. Here, the image determined by the erasure completion information is a two-dimensional bar code that indicates the erasure completion information. Therefore, the result of having read the disposal image as a two-dimensional bar code is obtained as analysis information. In a case where the analysis information indicates that the medium identification information identified by the image data agrees with the erasure completion information associated with the content record, the determination part 369 determines that the sheet of paper identified by the medium identification information has been discarded. In other words, in a case where the two-dimensional bar code having the third color extracted from the image data agrees with the erasure completion information, the determination part 369 determines that the image of the content identified by the content identification information, which is associated with the medium identification information by the content record, has been discarded. The determination part 369 extracts, from the HDD 304, a content record that includes the content identification information, and sets, in the extracted content record, a discard flag indicating having been discarded. This enables to manage, as a discarded state, the sheet of paper on which the image of the content has been formed.

In order to cause a disposal image to have the third color, it is necessary to form the image at the time of formation and the image at the time of discarding at the same position, to form the image at the time of formation with the first color, and to form the image at the time of discarding with the second color. Therefore, in a case where falsification has occurred, for example, in a case where the sheet of paper on which the image of the content has been formed is replaced with a different sheet of paper at the time of discarding operation, the image of the content can be prevented from being determined to be in a discarded state. In addition, the erasure image and the image at the time of discarding are concurrently formed, and the disposal image is formed on the sheet of paper by forming the image at the time of discarding. Therefore, a check can be made that the image of the content becomes readable by the erasure image.

Figure 10:
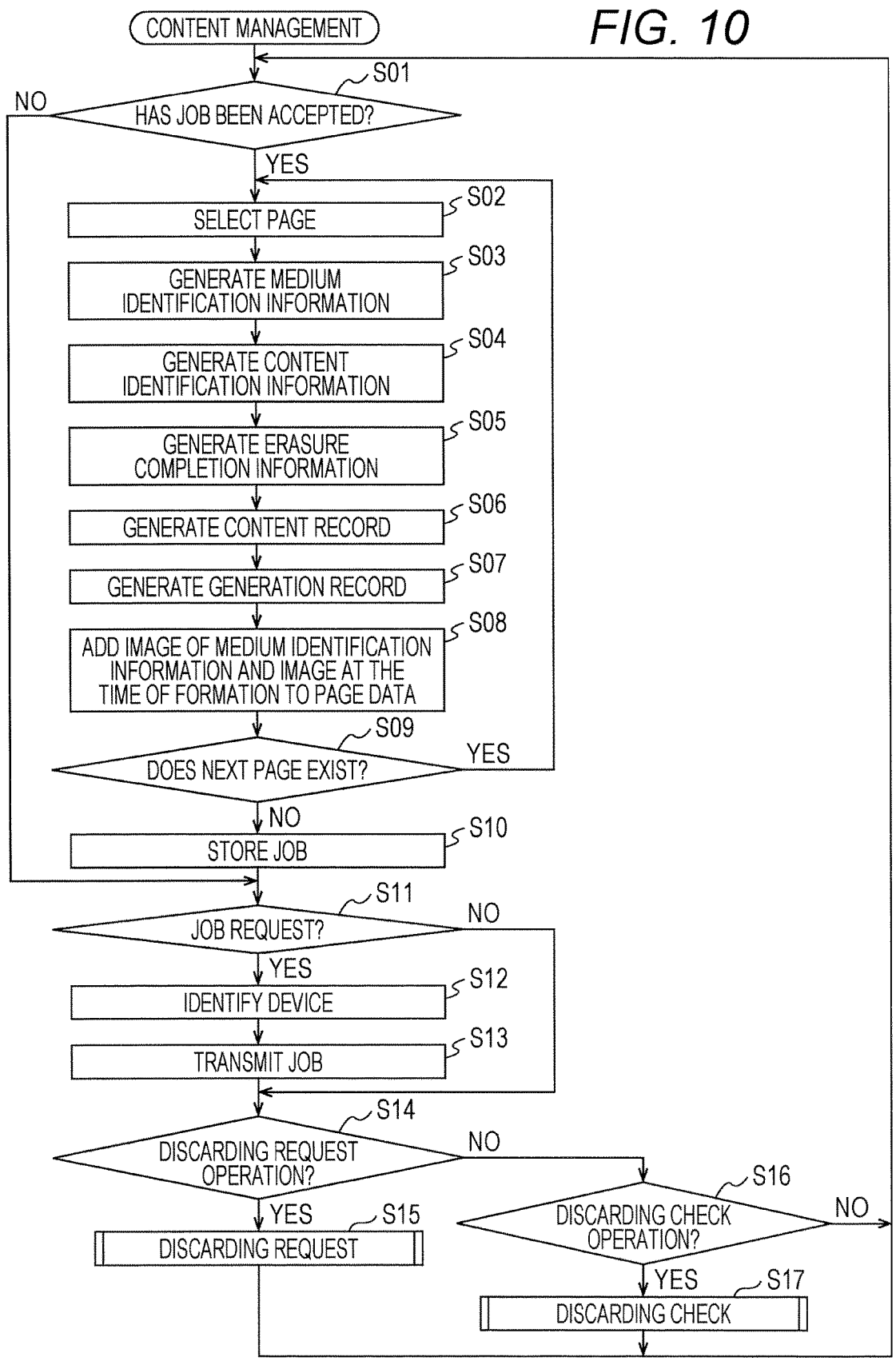
FIG. 10 is a flowchart illustrating, as an example, a flow of content management processing according to one or more embodiments of the present invention.

FIG. 10 is a flowchart illustrating, as an example, a flow of content management processing according to one or more embodiments of the present invention. The content management processing is processing executed by the CPU 301 when the CPU 301 provided in the server 300 executes a content management program stored in the ROM 302, the HDD 304 or the CD-ROM 309A. Referring to FIG. 10, the CPU 301 provided in the server 300 determines whether or not a job has been accepted (step S01). If a job has been accepted, the process proceeds to step S02. However, if not, the process proceeds to step S11. The job accepted here includes a print job that is received from the PC connected to the network 3 by the communication part 305. The CPU 301 stores the received job in the HDD 304. The print job includes print data composed of one or more pages.

In step S02, a page to be processed is selected from among pieces of print data included in the job received in step S01, and then the process proceeds to step S03. In step S03, medium identification information is generated, and then the process proceeds to step S04. The medium identification information is information that is given to a sheet of paper on which an image of print data of the page selected in step S02 is formed, and that is used to distinguish the sheet of paper from the other sheets of paper. The medium identification information is not limited. However, for example, a set of information indicating the medium identification information and a serial number may be given. In addition, there is a case where to a sheet of paper stored in the MFP 100, medium identification information used to identify the sheet of paper is given. In this case, the camera 209 of the smart phone 200 is used to image-capture an image indicating the medium identification information given to the sheet of paper, and image data output by the camera 209 is obtained from the smart phone 200.

In step S04, content identification information is generated for the print data of the page selected in step S02, and then the process proceeds to step S05. The content identification information is information used to distinguish the print data of the page selected in step S02 from the other pieces of print data. Although not limited, the content identification information may be information obtained by combining job identification information used to identify a print job with page identification information used to identify the page selected in step S02.

In step S05, erasure completion information is generated, and then the process proceeds to step S06. The erasure completion information is information indicating that for the sheet of paper on which the image of the print data of the page selected in step S02 has been formed, erasing of the image of the print data has been completed. The erasure completion information has only to be distinguishable from the other pieces of erasure completion information, and thus is not limited. However, for example, a set of information indicating the erasure completion information and a serial number may be used.

In step S06, a content record is generated, and then the process proceeds to step S07. A content record that includes the medium identification information generated in step S03, the content identification information generated in step S04, and the erasure completion information generated in step S05 is generated, and is then stored in the HDD 304. The content record is information that associates content with a sheet of paper on which an image of the content is formed, and with erasure completion information.

In the next step S07, a generation record corresponding to the erasure completion information generated in step S05 is generated, and then the process proceeds to step S08. The generation record has the format shown in FIG. 6, and associates the erasure completion information with the generation information. More specifically, an image at the time of formation and an image at the time of discarding, each of which has the same shape as that of the image of the two-dimensional bar code indicating the erasure completion information, are determined. Subsequently, a color of the image at the time of formation is determined as the first color, and a color of the image at the time of discarding is determined as the second color. A plurality of sets of combinations of the first color and the second color are prepared beforehand, and one from among the plurality of sets has only to be arbitrarily determined. Subsequently, a position at which the image at the time of formation is formed on the sheet of paper is determined as an image position. The image position has only to fall within an area other than the area in which the image of the content is formed. Moreover, in order to form the image at the time of formation and the image at the time of discarding at the same position, a relative position is determined to be 0 both in the horizontal and vertical directions.

In step S08, the image of the medium identification information generated in step S03 and the image at the time of formation are added to the print data of the page selected in step S02. More specifically, the image indicating the medium identification information and the image at the time of formation are synthesized into the print data. Here, the image indicating the medium identification information is a two-dimensional bar code of the medium identification information. The image indicating the medium identification information is not limited to the two-dimensional bar code, but may be a one-dimensional bar code, or may be an image that is readable by a person. For example, in a case where the medium identification information is composed of sequences of alphanumeric numbers or characters, the image indicating the medium identification information may be an image of sequences of alphanumeric numbers or characters.

The image at the time of formation is an image related to the erasure completion information, and a shape, a color and a position on a sheet of paper are determined by the generation information included in the generation record generated in step S07. Here, a shape of the image at the time of formation is the same as that of the two-dimensional bar code of the erasure completion information, and a color of the image at the time of formation is the first color. It should be noted that the shape of the image at the time of formation is not limited to the two-dimensional bar code, but may be a one-dimensional bar code, or may be an image that is readable by a person. For example, in a case where area identification information is composed of sequences of alphanumeric numbers or characters, the image at the time of formation may be an image of sequences of alphanumeric numbers or characters.

In step S09, a determination is made as to whether or not a page that is not selected as a page to be processed exists from among pieces of print data included in the job received in step S01. If an unselected page exists, the process returns to step S02. However, if not, the process proceeds to step S10.

In step S10, a print job in which the image of the medium identification information and the image at the time of formation are synthesized into the print data included in the job received in step S01 is stored in the HDD 304, and then the process proceeds to step S11.

In step S11, a determination is made as to whether or not a request of a job has been made. If the communication part 305 receives a print job transmission request, the process proceeds to step S12. However, if not, the process proceeds to step S14. For example, in a case where the communication part 305 is controlled to communicate with the MFP 100, a list of print jobs stored in the HDD 304 is transmitted to the MFP 100. In a case where a print job is specified by a user who operates the MFP 100, it is determined that the transmission request has been made for a specified print job.

In step S12, a device that has requested the job is identified. For example, in a case where the job transmission request is received from the MFP 100, the MFP 100 is identified. A case where a job transmission request is received from the MFP 100 will be described below as an example. In step S13, the print job requested in step S11 is transmitted to the device (here, the MFP 100) identified in step S12, and then the process proceeds to step S14. As the result, the print job is executed, and an image of the print data is formed on the sheet of paper in the MFP 100. The print data is data obtained by synthesizing the image of the medium identification information and the image at the time of formation into the image of the content. Therefore, on the sheet of paper, the image of the medium identification information and the image at the time of formation are formed in the image of the content.

In step S14, a determination is made as to whether or not discarding request operation has been accepted. If the discarding request operation has been accepted, the process proceeds to step S15. However, if not, the process proceeds to step S16. A determination is made as to whether or not the communication part 305 has received the discarding request operation from other devices. There is a case where, for example, the smart phone 200 transmits the discarding request operation. In step S15, discarding request processing is executed, and then the process returns to step S01. The discarding request processing will be described later in detail.

In step S16, a determination is made as to whether or not discarding check operation has been accepted. If the discarding check operation has been accepted, the process proceeds to step S17. However, if not, the process returns to step S01. A determination is made as to whether or not the communication part 305 has received the discarding check operation from other devices. There is a case where, for example, the smart phone 200 transmits the discarding check operation. In step S17, discarding check processing is executed, and then the process returns to step S01. The discarding check processing will be described later in detail.

Figure 11:
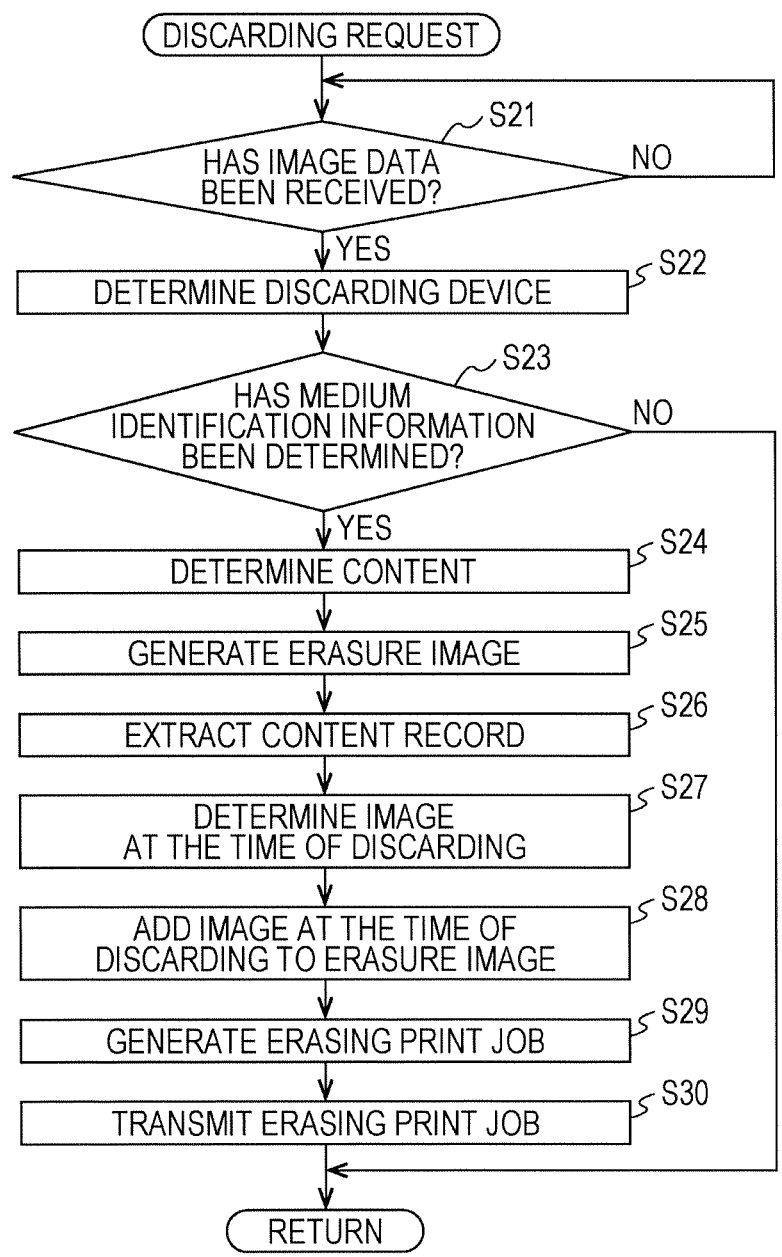
FIG. 11 is a flowchart illustrating, as an example, a flow of discarding request processing according to one or more embodiments of the present invention.

FIG. 11 is a flowchart illustrating, as an example, a flow of discarding request processing. The discarding request processing is processing executed in step S15 of FIG. 10. Here, a case where the communication part 305 accepts the discarding request operation from the smart phone 200 will be described as an example. In a case where a user operates the smart phone 200 to perform the discarding request operation, the user performs: operation of setting a sheet of paper to be discarded in the MFP 100; operation of image-capturing an image indicating medium identification information formed on the sheet of paper by using the camera 209; and operation of specifying the MFP 100. The smart phone 200 transmits a set of image data that is obtained by image-capturing by the camera 209, and that is output by the camera 209, and the device identification information of the MFP 100 specified by the user, to the server 300.

Referring to FIG. 11, the CPU 301 determines whether or not image data has been received from the smart phone 200 (step S21). The process is kept in a standby state (NO in step S21) until the communication part 305 receives image data from the smart phone 200. When the communication part 305 receives image data (YES in step S21), the process proceeds to step S22.

In step S22, a discarding device is determined. In a case where device identification information of the MFP 100 is received from the smart phone 200, the MFP 100 is determined as the discarding device. In the next step S23, a determination is made as to whether or not medium identification information is determined. The image data received in step S21 is analyzed, and in a case where an image indicating medium identification information is extracted from the image data, the medium identification information is determined. Here, the image indicating medium identification information is a two-dimensional bar code, and therefore the two-dimensional bar code is extracted from the image data, and medium identification information indicated by the two-dimensional bar code is determined. If the medium identification information has been determined, the process proceeds to step S24. However, if not, the process returns to the content management processing.

In step S24, content is determined with reference to a content record stored in the HDD 304. A content record that includes the medium identification information determined in step S23 is extracted, and content identified by content identification information included in the extracted content record is determined. In a case where the content identification information includes job identification information and page identification information, print data of the page identified by the page identification information, from among pieces of print data included in the print job stored in the HDD 304, is determined as the content.

In the next step S25, an erasure image is generated. The erasure image is image data corresponding to the content determined in step S24. When the erasure image is formed on a sheet of paper, characters in the image of the content formed on the sheet of paper are brought into an undecryptable state. The erasure image may be an image in which for each of a plurality of characters included in the content, a rectangular area having a size larger than that of the each character is made black. The erasure image may be an image having low lightness as an alternative to black. Overwriting an image having lightness lower than that of characters enables to prevent the characters from being read. The reason is that, for example, in a case where the erasure image is an image having lightness higher than that of characters, there is a case where the characters are transparent and consequently are readable.

In step S26, a content record is extracted. The content record that includes the content identification information determined in step S24 is extracted. In the next step S27, an image at the time of discarding is determined. A generation record corresponding to the erasure completion information included in the extracted content record is read from the HDD 304, and generation information included in the read generation record is identified. The generation information determines an image at the time of discarding, the second color, an image position, and a relative position. In the next step S28, an image at the time of discarding is added to the erasure image, and then the process proceeds to step S29. More specifically, the image at the time of discarding determined in step S27 is synthesized, with the second color, into the erasure image at a position determined by the image at the time of formation arranged at the image position, and by the relative position. Here, a shape of the image at the time of discarding is the same as that of the two-dimensional bar code of the erasure completion information, a color of the image at the time of discarding is the second color, and the image at the time of discarding is synthesized with the erasure image so as to be arranged at the same position as the position determined by the image position.

In the next step S29, an erasing print job is generated. A print job for forming, on a sheet of paper, an erasure image to which the image at the time of discarding has been added is generated as the erasing print job. Subsequently, an erasing print job is transmitted to the discarding device, and then the process returns to the content management processing. More specifically, the communication part 305 is controlled to transmit the erasing print job to a device (here, the MFP 100) determined as the discarding device in step S22. As the result, the erasure image to which the image at the time of discarding has been added is formed on the sheet of paper set in the MFP 100 by the user. Therefore, by forming the erasure image, the image of the content formed on the sheet of paper is brought into an undecryptable state, and an image at the time of discarding is formed so as to be superimposed on the image at the time of formation formed on the sheet of paper. The image at the time of discarding having the second color is formed so as to be superimposed on the image at the time of formation having the first color.

Therefore, a two-dimensional bar code having the third color is formed on the sheet of paper.

Figure 12:
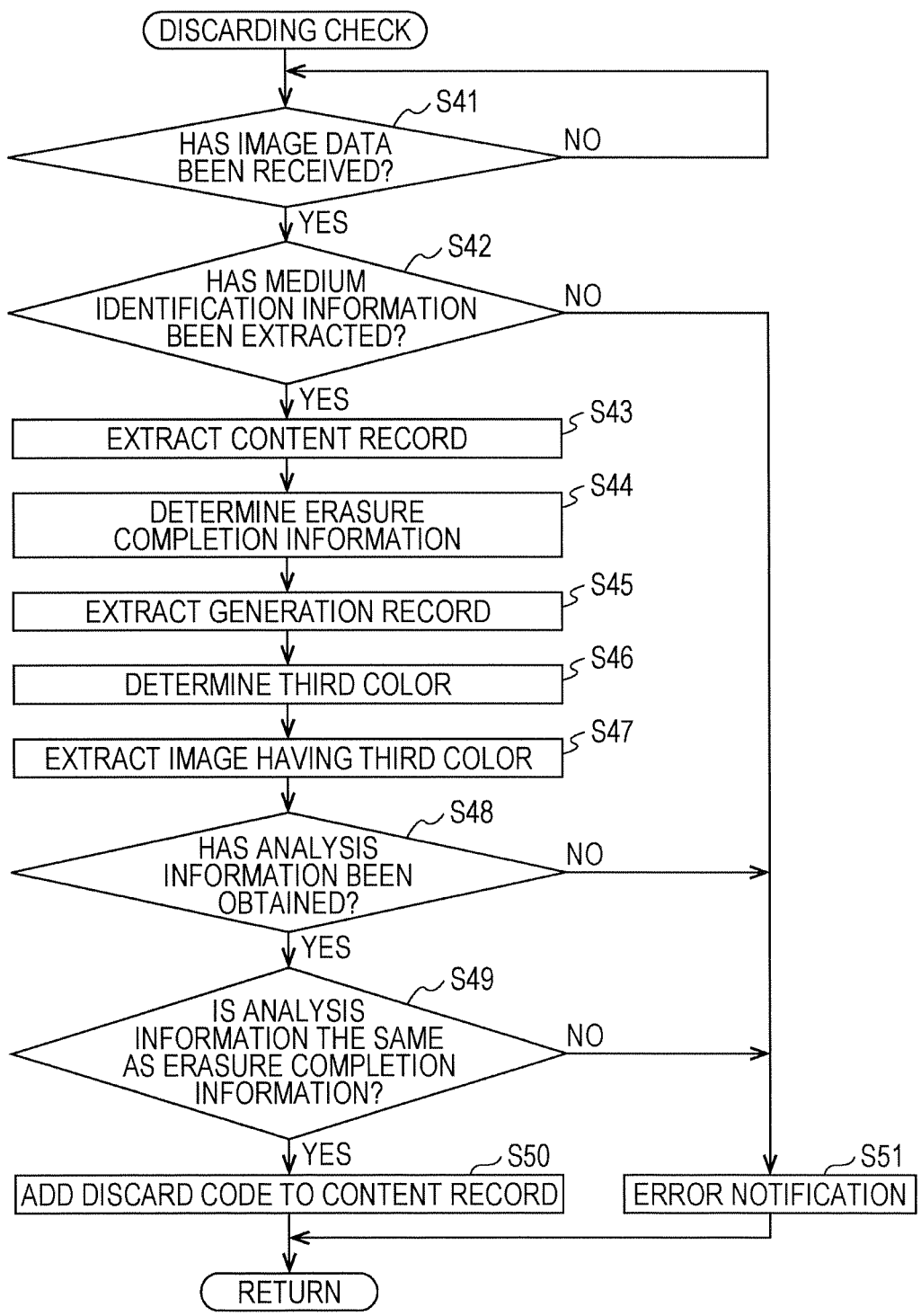
FIG. 12 is a flowchart illustrating, as an example, a flow of discarding check processing according to one or more embodiments of the present invention.

FIG. 12 is a flowchart illustrating, as an example, a flow of discarding check processing. The discarding check processing is processing executed in step S17 of FIG. 10. Referring to FIG. 12, the CPU 301 determines whether or not image data has been received from the smart phone 200 (step S41). The process is kept in a standby state (NO in step S41) until the communication part 305 receives image data from the smart phone 200. When the communication part 305 receives image data (YES in step S41), the process proceeds to step S42.

In step S42, a determination is made as to whether or not medium identification information is extracted. The image data received in step S41 is analyzed, and an image indicating medium identification information is extracted from the image data. Here, the image indicating medium identification information is a two-dimensional bar code, and therefore the two-dimensional bar code is extracted from the image data, and medium identification information indicated by the two-dimensional bar code is determined. If the medium identification information has been determined, the process proceeds to step S43. However, if not, the process proceeds to step S51.

In step S43, a content record is extracted. A content record that includes the medium identification information extracted in step S42 is extracted from content records stored in the HDD 304. Subsequently, erasure completion information determined by the content record extracted in step S43 is determined (step S44). In the next step S45, a generation record that includes the erasure completion information determined in step S44 is extracted from generation records stored in the HDD 304. In the next step S46, the third color is determined. The third color that is predetermined for a set of the first color and the second color determined by the generation record extracted in step S44 is determined. In the next step S47, a disposal image having the third color is extracted from the image data received in step S41. Moreover, a determination is made as to whether or not analysis information has been obtained from the disposal image having the third color. If the disposal image having the third color is a two-dimensional bar code, information indicated by the two-dimensional bar code having the third color is obtained as the analysis information. If the analysis information has been obtained, the process proceeds to step S49. However, if not, the process proceeds to step S51.

In step S49, a determination is made as to whether or not the analysis information is the same as the erasure completion information determined in step S44. If the analysis information is the same as the erasure completion information, the process proceeds to step S50. However, if not, the process proceeds to step S51. In step S50, a discard code is added to the content record extracted in step S43, and the process returns to the content management processing. This enables to manage, as a discarded state, the sheet of paper on which the image of the content has been formed.

In step S51, an error is notified, and the process returns to the content management processing. In order to display, on a device that has transmitted the discarding check operation (here, the smart phone 200), a message notifying that the sheet of paper is not properly discarded, the communication part 305 is controlled to transmit the message to the smart phone 200. Displaying the message enables the user who operates the smart phone 200 to recognize that the content formed on the sheet of paper has not been properly discarded.

In one or more embodiments of the present invention, when an image of content is formed on a sheet of paper, the image of the content and an image at the time of formation having the first color are formed on the sheet of paper, and according to discarding request operation by a user, an erasure image and an image at the time of discarding having the second color are formed on the sheet of paper on which the image of the content has been formed. Moreover, according to discarding check operation by the user, the user image-captures the sheet of paper by using the camera 209 of the smart phone 200. Consequently, image data obtained by image-capturing the sheet of paper by using the camera 209 is obtained. Subsequently, in a case where medium identification information, and erasure completion information that is associated with the medium identification information by the content record, are extracted from the image data obtained from the smart phone 200, it is determined that the content formed on the sheet of paper identified by the medium identification information has been erased. Here, conditions for determining that erasure completion information is extracted from the image data include: a condition indicating that a disposal image having the third color determined from the first color of the image at the time of formation and the second color of the image at the time of discarding is extracted; a condition indicating that analysis information can be obtained by analyzing the disposal image having the third color; and a condition indicating that the analysis information agrees with the erasure completion information. In other words, in a case where erasure completion information can be read as the result of executing processing of reading the two-dimensional bar code having the third color from the image data, it may be determined that the content formed on the sheet of paper has been erased.

As described above, in the content management system 1 according to one or more embodiments of the present invention, a check can be made, by the shape and color of the two-dimensional bar code indicating the erasure completion information, that the sheet of paper on which the image of the content has been formed is the same as the sheet of paper on which the erasure image has been formed. Therefore, a check can be made, with high reliability, that the image of the content formed on the sheet of paper has been erased.

First Modified Example

In the embodiments described above, conditions for determining that erasure completion information can be identified from the image data include: a condition indicating that a disposal image having the third color determined from the first color of the image at the time of formation and the second color of the image at the time of discarding is extracted; a condition indicating that analysis information can be obtained by analyzing the disposal image having the third color; and a condition indicating that the analysis information agrees with the erasure completion information. In the first modified example, a condition for determining that erasure completion information can be identified from the image data is a first condition indicating that an image at the time of formation and an image at the time of discarding corresponding to medium identification information are extracted.

In the first modified example, generation information has only to include at least an image at the time of formation and an image at the time of discarding. More specifically, when an image of content is formed on a sheet of paper, the image of the content and an image at the time of formation are formed on the sheet of paper, and according to discarding request operation by a user, an erasure image and an image at the time of discarding are formed on the sheet of paper on which the image of the content has been formed. In this case, the image at the time of discarding is formed so as not to be superimposed on the erasure image. Moreover, according to discarding check operation by the user, the user image-captures the sheet of paper by using the camera 209 of the smart phone 200. Consequently, image data obtained by image-capturing the sheet of paper by using the camera 209 is obtained. Subsequently, in a case where medium identification information, an image at the time of formation, and an image at the time of discarding are extracted from the image data obtained from the smart phone 200, it is determined that the first condition has been fulfilled.

More specifically, in a case where the image data is input from the captured image acquisition part 359, the determination part 369 extracts an image indicating medium identification information included in the image data, and identifies the medium identification information. The determination part 369 extracts, from content records stored in the HDD 304, a content record that includes medium identification information identified by the image data, and determines erasure completion information from the extracted content record. The determination part 369 extracts, from generation records stored in the HDD 304, a generation record that includes erasure completion information, and determines an image at the time of formation and an image at the time of discarding from the extracted generation record. In a case where an image at the time of formation and an image at the time of discarding can be extracted from image data input from the captured image acquisition part 359, the determination part 369 determines that the sheet of paper identified by the medium identification information has been discarded. The image at the time of formation and the image at the time of discarding have only to be images related to erasure completion information. For example, the image at the time of formation may be a two-dimensional bar code indicating information obtained by adding information indicating the image at the time of formation to the erasure completion information, and the image at the time of discarding may be a two-dimensional bar code indicating information obtained by adding information indicating the image at the time of discarding to the erasure completion information. In this case, by analyzing the two-dimensional bar code included in the image data, it can be determined that the image at the time of formation and the image at the time of discarding are included in the image data. The determination part 369 extracts, from the HDD 304, a content record that includes the content identification information, and sets, in the extracted content record, a discard flag indicating having been discarded. This enables to manage, as a discarded state, the sheet of paper on which the image of the content has been formed.

Figure 13C:
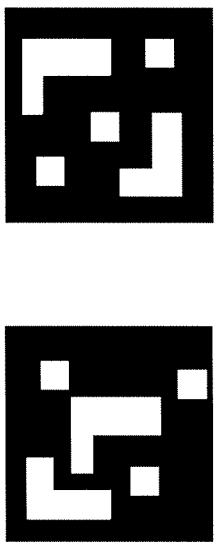
FIGS. 13A to 13C are drawings illustrating, as examples, an image at the time of formation, an image at the time of discarding, and a disposal image respectively in a first modified example according to one or more embodiments of the present invention.
Figure 13B:
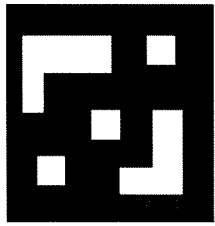
Figure 13A:
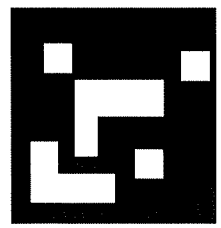

FIGS. 13A to 13C are drawings illustrating, as examples, an image at the time of formation, an image at the time of discarding, and a disposal image respectively in the first modified example. FIG. 13A is a drawing illustrating, as an example, an image at the time of formation in the first modified example. The image at the time of formation in the first modified example has a shape of a two-dimensional bar code. Although the image at the time of formation is black in color, the color is not limited. The image at the time of formation may have any color. FIG. 13B is a drawing illustrating, as an example, an image at the time of discarding in the first modified example. The image at the time of discarding in the first modified example is a two-dimensional bar code. Although the image at the time of formation is black in color, the color is not limited. The image at the time of formation may have any color. FIG. 13C is a drawing illustrating, as an example, a disposal image in the first modified example. The disposal image in the first modified example includes an image at the time of formation and an image at the time of discarding.

In the content management system 1 in the first modified example, the server 300 associates content with erasure completion information. An image of the content, and an image at the time of formation that is a two-dimensional bar code as information obtained by adding information indicating being the image at the time of formation to the erasure completion information, are formed on a sheet of paper. An erasure image, and an image at the time of discarding that is a two-dimensional bar code as information obtained by adding information indicating being the image at the time of discarding to the erasure completion information, are formed. In a case where image data obtained by image-capturing the sheet of paper by using the smart phone 200 includes the image at the time of formation and the image at the time of discarding, it is determined that the sheet of paper on which the image of the content associated with the erasure completion information has been formed has been discarded, and that the content has been erased. In a case where the image at the time of formation and the image at the time of discarding are included, it is determined that the recording medium on which the image of the content has been formed is the same as the recording medium on which the erasure image has been formed. Therefore, a check can be made, with high reliability, that the image of the content formed on the sheet of paper has been erased.

Second Modified Example

In the second modified example, conditions for determining that erasure completion information is identified from image data are: the first condition, in the first modified example, indicating that an image at the time of formation and an image at the time of discarding corresponding to medium identification information are extracted; and a second condition indicating that an image at the time of discarding is formed at a predetermined relative position relative to the image at the time of formation.

In the second modified example, generation information has only to include at least an image at the time of formation, an image at the time of discarding, an image position, and a relative position. More specifically, when an image of content is formed on a sheet of paper, the image of the content and an image at the time of formation are formed on the sheet of paper, and according to discarding request operation by a user, an erasure image and an image at the time of discarding are formed on the sheet of paper on which the image of the content has been formed. In this case, the image at the time of discarding is arranged at a position determined by the generation information as a relative position relative to the image position, and is formed on the sheet of paper. Moreover, according to discarding check operation by the user, the user image-captures the sheet of paper by using the camera 209 of the smart phone 200. Consequently, image data obtained by image-capturing the sheet of paper by using the camera 209 is obtained. Subsequently, in a case where the medium identification information, the image at the time of formation, and the image at the time of discarding are extracted from the image data obtained from the smart phone 200, it is determined that the first condition has been fulfilled. If a relative position of the image at the time of formation relative to the image at the time of discarding agrees with the relative position determined by the generation information, it is determined that the second condition has been fulfilled.

More specifically, in a case where the determination part 369 in the second modified example is capable of extracting the image at the time of formation and the image at the time of discarding from image data input from the captured image acquisition part 359, and in a case where a relative position of the image at the time of formation relative to the image at the time of discarding is the relative position determined by the generation information, it is determined that the sheet of paper identified by the medium identification information has been discarded.

Figures 14A, 14B, 14C:
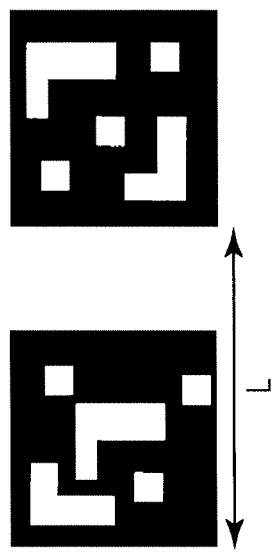
FIGS. 14A to 14C are first drawings illustrating, as examples, an image at the time of formation, an image at the time of discarding, and a disposal image respectively in a second modified example according to one or more embodiments of the present invention.

FIGS. 14A to 14C are first drawings illustrating, as examples, an image at the time of formation, an image at the time of discarding, and a disposal image respectively in the second modified example. FIG. 14A is a first drawing illustrating, as an example, an image at the time of formation in the second modified example. The image at the time of formation in the second modified example has a shape of a two-dimensional bar code. Although the image at the time of formation is black in color, the color is not limited. The image at the time of formation may have any color. FIG. 14B is a first drawing illustrating, as an example, an image at the time of discarding in the second modified example. The image at the time of discarding in the second modified example is a two-dimensional bar code. Although the image at the time of formation is black in color, the color is not limited. The image at the time of formation may have any color. FIG. 14C is a first drawing illustrating, as an example, a disposal image in the second modified example. The disposal image in the second modified example includes an image at the time of formation and an image at the time of discarding. In addition, the relative position of the image at the time of formation relative to the image at the time of discarding is a position that is moved in parallel by a distance L from the image at the time of formation in the right direction (X-axis direction).

In the content management system 1 in the second modified example, the server 300 associates content with erasure completion information. An image of the content, and an image at the time of formation that is a two-dimensional bar code as information obtained by adding information indicating being the image at the time of formation to the erasure completion information, are formed on a sheet of paper. An erasure image, and an image at the time of discarding that is a two-dimensional bar code as information obtained by adding information indicating being the image at the time of discarding to the erasure completion information, are formed at relative positions that are predetermined relative to the image at the time of formation. In a case where image data obtained by image-capturing the sheet of paper by using the smart phone 200 includes the image at the time of formation and the image at the time of discarding, and in a case where a relative position of the image at the time of formation relative to the image at the time of discarding is the predetermined relative position, it is determined that the sheet of paper on which the image of the content associated with the erasure completion information has been formed has been discarded, and that the content has been erased. The relative position of the image at the time of formation relative to the image at the time of discarding is added to a condition for determining that the sheet of paper on which the image of the content has been formed is the same as the sheet of paper on which the erasure image has been formed.

Therefore, a check can be made, with high reliability, that the image of the content formed on the sheet of paper has been erased.

Third Modified Example

In the third modified example, a two-dimensional bar code indicating erasure completion information is divided into two, and one of the divided parts is treated as an image at the time of formation, and the other is treated as an image at the time of discarding.

Figure 15C:
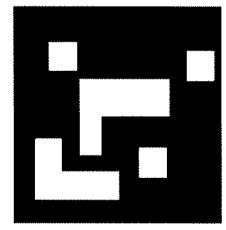
FIGS. 15A to 15C are first drawings illustrating, as examples, an image at the time of formation, an image at the time of discarding, and a disposal image respectively in a third modified example according to one or more embodiments of the present invention.
Figure 15B:
Figure 15A:

FIGS. 15A to 15C are first drawings illustrating, as examples, an image at the time of formation, an image at the time of discarding, and a disposal image respectively in the third modified example. Here, a two-dimensional bar code of erasure completion information is divided into two, and one of the divided parts is treated as an image at the time of formation, and the other is treated as an image at the time of discarding. FIG. 15A is a first drawing illustrating, as an example, an image at the time of formation in the third modified example. Although the image at the time of formation is black in color, the color is not limited. The image at the time of formation may have any color. FIG. 15B is a first drawing illustrating, as an example, an image at the time of discarding in the third modified example. Although the image at the time of discarding is black in color, the color is not limited. The image at the time of discarding may have any color. The image at the time of formation in the third modified example is one of two parts into which the two-dimensional bar code of the erasure completion information has been divided, and the image at the time of discarding in the third modified example is the other of the two parts. FIG. 15C is a first drawing illustrating, as an example, a disposal image in the third modified example. The disposal image in the third modified example is a two-dimensional bar code of the erasure completion information.

In this case, when a disposal image indicating a two-dimensional bar code is extracted from image data input from the captured image acquisition part 359, in a case where analysis information obtained by analyzing the disposal image agrees with the erasure completion information, the determination part 369 in the third modified example determines that the sheet of paper identified by the medium identification information has been discarded.

Figure 16C:
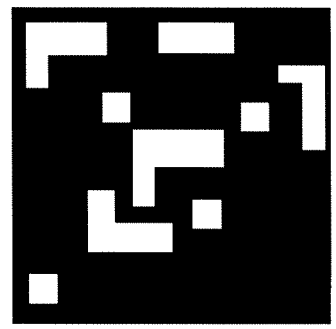
FIGS. 16A to 16C are second drawings illustrating, as examples, an image at the time of formation, an image at the time of discarding, and a disposal image respectively in the third modified example according to one or more embodiments of the present invention.
Figure 16B:
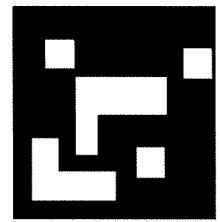
Figure 16A:
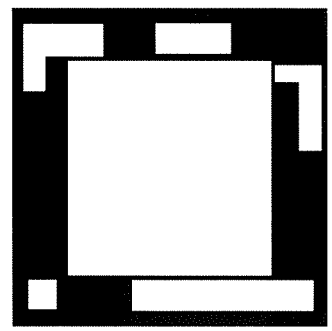

FIGS. 16A to 16C are second drawings illustrating, as examples, an image at the time of formation, an image at the time of discarding, and a disposal image respectively in the third modified example. Here, a two-dimensional bar code of erasure completion information is divided into two, and one of the divided parts is treated as an image at the time of formation, and the other is treated as an image at the time of discarding. FIG. 16A is a second drawing illustrating, as an example, an image at the time of formation in the third modified example. The image at the time of formation in the third modified example is one of two parts into which the two-dimensional bar code of the erasure completion information has been divided. Although the image at the time of formation is black in color, the color is not limited. The image at the time of formation may have any color. FIG. 16B is a second drawing illustrating, as an example, an image at the time of discarding in the third modified example. The image at the time of discarding in the third modified example is the other of the two parts into which the two-dimensional bar code of the erasure completion information has been divided. Although the image at the time of discarding is black in color, the color is not limited. The image at the time of discarding may have any color. FIG. 16C is a second drawing illustrating, as an example, a disposal image in the third modified example. The disposal image in the third modified example is a two-dimensional bar code of the erasure completion information.

In this case as well, when a disposal image indicating a two-dimensional bar code is extracted from image data input from the captured image acquisition part 359, in a case where analysis information obtained by analyzing the disposal image agrees with the erasure completion information, the determination part 369 in the third modified example determines that the sheet of paper identified by the medium identification information has been discarded.

In the content management system 1 in the third modified example, the server 300 associates content with erasure completion information. One of two parts into which the two-dimensional bar code of the erasure completion information is divided is treated as an image at the time of formation, the other of the two parts is treated as an image at the time of discarding, and the image of the content and the image at the time of formation are formed on the sheet of paper. The erasure image and the image at the time of discarding are formed at relative positions that are predetermined relative to the image at the time of formation. On the condition that image data obtained by image-capturing the sheet of paper by using the smart phone 200 includes a two-dimensional bar code that indicates the erasure completion information, it is determined that the sheet of paper on which the image of the content associated with the erasure completion information has been formed has been discarded, and that the content has been erased. On the condition that a relative position of the image at the time of formation relative to the image at the time of discarding is the predetermined relative position, it can be checked that a recording medium on which the image of the content has been formed is the same as a recording medium on which the erasure image has been formed. Therefore, a check can be made, with high reliability, that the image of the content formed on the sheet of paper has been erased.

Fourth Modified Example

In the fourth modified example, conditions for determining that erasure completion information is extracted from the image data are: the first condition indicating that an image at the time of formation and an image at the time of discarding corresponding to medium identification information are extracted; the second condition indicating that an image at the time of discarding is formed at a predetermined relative position relative to the image at the time of formation; and a third condition indicating that the disposal image has a predetermined color.

In the fourth modified example, the disposal image is a two-dimensional bar code indicating the erasure completion information having the first color. For example, the image at the time of formation in the fourth modified example is an image that is obtained by synthesizing an arbitrary image into the two-dimensional bar code of the erasure completion information from the surrounding toward the outside by a predetermined distance, and that has the first color. The image at the time of discarding in the fourth modified example includes an area ranging from the surrounding of the two-dimensional bar code of the erasure completion information toward the outside by a predetermined distance, and the area is an image having the second color.

More specifically, when an image of content is formed on a sheet of paper, an image at the time of formation having the first color and the image of the content are formed on the sheet of paper, and according to discarding request operation by a user, an erasure image and an image at the time of discarding having the second color are formed on the sheet of paper on which the image of the content has been formed. The image at the time of discarding having the second color is formed at a position that is determined by a relative position from the image position at which the image at the time of formation has been formed, and consequently the disposal image having the first color is completed. Moreover, according to discarding check operation by the user, the user image-captures an image indicating the medium identification information by using the camera 209 of the smart phone 200. As the result, image data obtained by image-capturing the image by using the camera 209 is obtained. Subsequently, a two-dimensional bar code indicating medium identification information and a disposal image having the first color are extracted from the image data obtained from the smart phone 200, and in a case where analysis information obtained by analyzing the disposal image agrees with erasure completion information, it is determined that the first condition, the second condition and the third condition have been fulfilled. In the fourth modified example, the generation information includes an image at the time of formation, the first color, an image position, an image at the time of discarding, the second color, and a relative position.

Figure 17C:
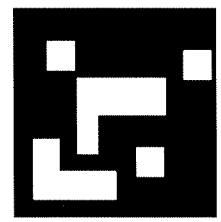
FIGS. 17A to 17C are drawings illustrating, as examples, an image at the time of formation, an image at the time of discarding, and a disposal image respectively in a fourth modified example according to one or more embodiments of the present invention.
Figure 17B:
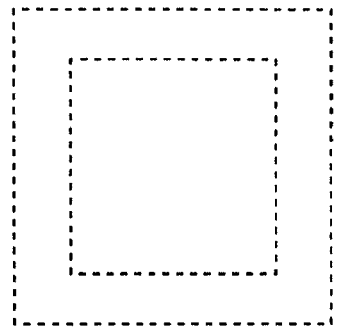
Figure 17A:
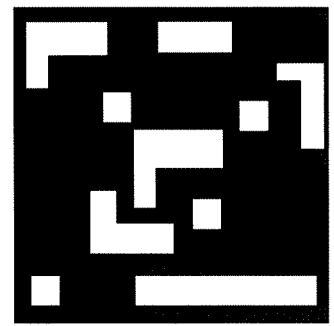

FIGS. 17A to 17C are drawings illustrating, as examples, an image at the time of formation, an image at the time of discarding, and a disposal image respectively in the fourth modified example. FIG. 17A is a drawing illustrating, as an example, an image at the time of formation in the fourth modified example. The image at the time of formation in the fourth modified example is an image that is obtained by synthesizing an arbitrary image into the two-dimensional bar code of the erasure completion information from the surrounding toward the outside by a predetermined distance, and that has the first color. FIG. 17B is a drawing illustrating, as an example, an image at the time of discarding in the fourth modified example. The image at the time of discarding in the fourth modified example includes an area that is away from the surrounding of the two-dimensional bar code of the erasure completion information by a predetermined distance, and the area is an image having the second color. FIG. 17C is a drawing illustrating, as an example, a disposal image in the fourth modified example. The disposal image in the fourth modified example is a two-dimensional bar code indicating erasure completion information, and has the first color.

In the content management system 1 in the fourth modified example, the server 300 associates content with erasure completion information. An image at the time of formation obtained by synthesizing an image of the content and an image at the time of discarding into a two-dimensional bar code of the erasure completion information is formed on a sheet of paper with the first color. An image at the time of discarding that is composed of an erasure image, and an area away from the outer periphery of the two-dimensional bar code of the erasure completion information by a predetermined distance, is formed so as to be superimposed on the image at the time of formation with the second color. By forming the image at the time of discarding having the second color so as to be superimposed on the image at the time of formation having the first color, a part in which the image at the time of discarding and the image at the time of formation do not overlap each other becomes an disposal image having the first color. The disposal image having the first color becomes a two-dimensional bar code indicating the erasure completion information. In a case where the disposal image having the first color included in the image data obtained by image-capturing the sheet of paper by using the smart phone 200 indicates the erasure completion information, the server 300 determines that the sheet of paper on which the image of the content associated with the erasure completion information has been formed has been discarded, and that the content has been erased. Therefore, a check can be made, by the shape and color of the disposal image indicating the erasure completion information, that the sheet of paper on which the image of the content has been formed is the same as the sheet of paper on which the erasure image has been formed. Therefore, a check can be made, with high reliability, that the image of the content formed on the sheet of paper has been erased.

The server 300 according to aforementioned embodiments forms an image at the time of formation and an image at the time of discarding on a sheet of paper, and consequently a disposal image indicating erasure completion information is formed on the sheet of paper. In one or more embodiments of the present invention, in a stage of forming an erasure image on the sheet of paper, an image at the time of discarding is not formed. Therefore, in one or more embodiments of the present invention, a generation record is not required.

The server 300 according to one or more embodiments of the present invention uses, as an erasure image, an image for erasing a part of content. Therefore, if an erasure image is formed on a sheet of paper on which an image of the content has been formed, a part of the content is not erased. In the server 300 according to one or more embodiments of the present invention, in a stage in which an erasure image is generated, the associating part 357 determines, as a partial image, an image that is included in an image of the content but is not included in the erasure image, and associates the partial image with the content. More specifically, the partial image is added to a content record. Subsequently, in the server 300 according to one or more embodiments of the present invention, the determination part 369 identifies erasure completion information from an image at the time of formation included in image data, and in a case where a fourth condition indicating that the image at the time of formation and the partial image determined by the content record are extracted from the image data is fulfilled, the determination part 369 determines that the content has been erased.

FIGS. 18A to 18C are drawings illustrating, as examples, an image at the time of formation, an erasure image, and a disposal image respectively according to one or more embodiments of the present invention. FIG. 18A is a drawing illustrating, as an example, an image at the time of formation in one or more embodiments of the present invention. FIG. 18A illustrates an image at the time of formation 501 and an image 503 of the content in one or more embodiments of the present invention. The image at the time of formation 501 is a two-dimensional bar code of erasure completion information. FIG. 18B is a drawing illustrating, as an example, an erasure image in one or more embodiments of the present invention. An erasure image 505 has a shape that does not overlap a character "C" that is a part of the image 503 of the content. FIG. 18C is a drawing illustrating, as an example, a disposal image in one or more embodiments of the present invention. In one or more embodiments of the present invention, a processed image includes the image at the time of formation 501, and the character "C" that is a part of the image 503 of the content.

In the content management system 1 according to one or more embodiments of the present invention, the server 300 associates content with erasure completion information and a partial image that is included in an image of the content but is not included in an erasure image. An image of the content, and an image at the time of formation that is a two-dimensional bar code indicating the erasure completion information, are formed. In a case where image data obtained by image-capturing the sheet of paper by using the smart phone 200 includes the image at the time of formation and the partial image, it is determined that the sheet of paper on which the image of the content associated with the erasure completion information has been formed has been discarded, and that the content has been erased. Therefore, a check can be made, by the image at the time of formation, that the sheet of paper has the image of the content formed thereon, and a check can be made, by the erasure image and the partial image, that the sheet of paper has the erasure image formed thereon. This enables to check that the sheet of paper on which the image of the content has been formed is the same as the sheet of paper on which the erasure image has been formed. Therefore, a check can be made, with high reliability, that the image of the content formed on the sheet of paper has been erased.

Fifth Modified Example

The server 300 according to one or more embodiments of the present invention uses, as an erasure image, an image for erasing a part of content. In the fifth modified example of one or more embodiments of the present invention, when an erasure image is generated, the server 300 adds a shape of the erasure image to a content record. In a stage in which an erasure image is generated by the erasure image generation part 365, the associating part 357 provided in the server 300 in the fifth modified example associates the erasure image with the content. More specifically, the erasure image is added to a content record. Subsequently, in the server 300 in the fifth modified example, the determination part 369 identifies erasure completion information from an image at the time of formation included in image data, and in a case where a fifth condition indicating that the erasure image determined by the content record is extracted from the image data is fulfilled, the determination part 369 determines that the content has been erased.

Figure 19A:
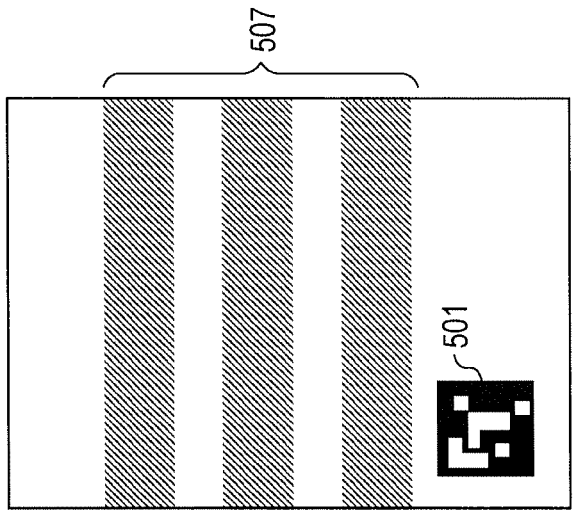
FIGS. 19A to 19C are drawings illustrating, as examples, an image at the time of formation, an erasure image, and a disposal image respectively in a fifth modified example according to one or more embodiments of the present invention.
Figure 19B:
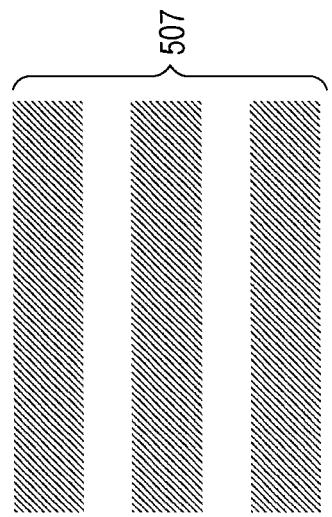
Figure 19C:
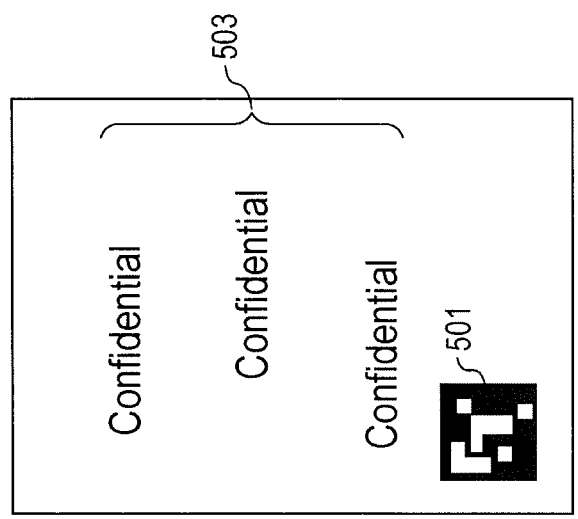

FIGS. 19A to 19C are drawings illustrating, as examples, an image at the time of formation, an erasure image, and a disposal image respectively in the fifth modified example. FIG. 19A is a drawing illustrating, as an example, an image at the time of formation in the fifth modified example. FIG. 19A illustrates the image at the time of formation 501 and the image 503 of the content in the fifth modified example. The image at the time of formation 501 is a two-dimensional bar code of erasure completion information. FIG. 19B is a drawing illustrating, as an example, an erasure image in the fifth modified example. FIG. 19C is a drawing illustrating, as an example, a disposal image in the fifth modified example. The disposal image in the fifth modified example includes the image at the time of formation 501 and an erasure image 507.

In the content management system 1 in the fifth modified example, the server 300 associates content with erasure completion information and an erasure image. An image of the content, and an image at the time of formation that is a two-dimensional bar code indicating the erasure completion information, are formed. In a case where image data obtained by image-capturing the sheet of paper by using the smart phone 200 includes the image at the time of formation and the erasure image, it is determined that the sheet of paper on which the image of the content associated with the erasure completion information has been formed has been discarded, and that the content has been erased. Therefore, a check can be made, by the image at the time of formation, that the sheet of paper has the image of the content formed thereon, and a check can be made, by the erasure image, that the sheet of paper has the erasure image formed thereon. This enables to check that the sheet of paper on which the image of the content has been formed is the same as the sheet of paper on which the erasure image has been formed. Therefore, a check can be made, with high reliability, that the image of the content formed on the sheet of paper has been erased.

The server 300 according to the aforementioned embodiments forms an image at the time of formation and an image at the time of discarding on a sheet of paper, and consequently a disposal image indicating erasure completion information is formed on the sheet of paper. In a stage of forming an image of the content on a sheet of paper, the server 300 according to one or more embodiments of the present invention does not form an image at the time of formation. Therefore, in one or more embodiments of the present invention, a generation record is not required.

In the server 300 according to one or more embodiments of the present invention, conditions for determining that erasure completion information is extracted from image data are: a sixth condition indicating that an image at the time of discarding corresponding to medium identification information is extracted; and a seventh condition indicating that an image at the time of discarding is formed at a predetermined relative position relative to an image indicating the medium identification information. Therefore, in the server 300 according to one or more embodiments of the present invention, the associating part 357 associates content with a relative position of an image indicating the medium identification information relative to an image at the time of discarding. More specifically, the relative position of the image indicating the medium identification information relative to the image at the time of discarding is added to the content record.

In one or more embodiments of the present invention, when an image of content is formed on a sheet of paper, the image of the content and an image indicating medium identification information are formed on the sheet of paper, and according to discarding request operation by a user, an erasure image and an image at the time of discarding are formed on the sheet of paper on which the image of the content has been formed. The image at the time of discarding is a two-dimensional bar code indicating erasure completion information. Moreover, according to discarding check operation by the user, the user image-captures the sheet of paper by using the camera 209 of the smart phone 200. Consequently, image data obtained by image-capturing the sheet of paper by using the camera 209 is obtained. Subsequently, in a case where an image indicating the medium identification information, and the image at the time of discarding are extracted from the image data obtained from the smart phone 200, the determination part 369 provided in the server 300 identifies erasure completion information from the image at the time of discarding, and in a case where a relative position of the image at the time of discarding relative to the image indicating the medium identification information is a relative position determined by position information of the content record, the determination part 369 determines that the seventh condition has been fulfilled, and determines that the content has been erased. In a case where executing processing of reading the two-dimensional bar code from the image data enables to read medium identification information and erasure completion information, it is determined that the sixth condition is fulfilled.

In the content management system 1 according to one or more embodiments of the present invention, the server 300 associates content with medium identification information used to identify a sheet of paper, erasure completion information, and a relative position of an image indicating the medium identification information relative to an image at the time of discarding. An image of the content, and the image indicating the medium identification information, which is a two-dimensional bar code indicating the medium identification information, are formed on the sheet of paper. An erasure image, and the image at the time of discarding, which is a two-dimensional bar code indicating the erasure completion information, are formed at the relative position of the image indicating the medium identification information relative to the image at the time of discarding. In a case where image data obtained by image-capturing the sheet of paper by using the smart phone 200 includes the image indicating the medium identification information and the image at the time of discarding, and in a case where a relative position of the image indicating the medium identification information relative to the image at the time of discarding is the predetermined relative position, it is determined that the sheet of paper on which the image of the content associated with the erasure completion information has been formed has been discarded, and that the content has been erased. The relative position of the image indicating the medium identification information relative to the image at the time of discarding is added to a condition for determining that the sheet of paper on which the image of the content has been formed is the same as the sheet of paper on which the erasure image has been formed. Therefore, a check can be made, with high reliability, that the image of the content formed on the sheet of paper has been erased.

Incidentally, in the embodiments described above, a case where the content is managed in the server 300 has been described as an example. However, the content may be managed in the MFP 100. In this case, the server 300 is not necessary. The CPU 111 provided in the MFP 100 has only to have the function of the CPU 301 provided in the server 300 shown in FIG. 6. In addition, although the content management system 1 has been explained, it is needless to say that one or more embodiments of the invention can be recognized as a content management method for causing the server 300 to execute the content management processing shown in FIGS. 10 to 12, and as a content management program for causing the CPU 301 provided in the server 300 to execute the content management method.

APPENDIX (1) The content management system according to one or more embodiments, wherein the image capturing device and the image forming device are arranged in the same housing, and the medium identification information obtainer obtains medium identification information from image data output when the image capturing device image-captures a recording medium as an object. According to this aspect, in a case where an image of the medium identification information is stored on a recording medium, the recording medium can be identified. (2) The content management system according to one or more embodiments, wherein the erasure image is a print pattern that makes the content unreadable. (3) The content management system according to one or more embodiments, wherein the discarding time controller controls the image forming device in such a manner that the erasure image is formed on the recording medium with the same color as that of the recording medium.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A content management method executed in a content management system, the content management method comprising:
    associating a content with erasure completion information indicating that the content has been erased;
    forming, on the recording medium, an image of the content and an image at a time of formation indicating the erasure completion information;
    in a case where an erasure image is formed to be superimposed on at least a part of the image of the content on the recording medium, forming, on the recording medium, an image at a time of discarding indicating the erasure completion information and the erasure image, wherein the image at the time of discarding is associated with the content; and
    in a case where the erasure completion information is identified by the image at the time of formation and the image at the time of discarding that are included in single image data output when the recording medium is image-captured as an object, determining that the content associated with the erasure completion information has been erased.

2. The content management method according to claim 1, wherein
    the image of the content is formed at the time of formation on the recording medium with a first color,
    a shape of the image at the time of discarding is the same as a shape of the image at the time of formation;
    the image at the time of discarding is formed at the time of discarding on the recording medium with a second color so as to be superimposed on the image at the time of formation, and
    the determining determines the erasure completion information based on a disposal image having a third color determined by the first color and the second color that are included in single image data output when the recording medium is image-captured as the object.

3. The content management method according to claim 1, wherein
    the image of the content is formed at the time of formation on the recording medium with a first color,
    the image at the time of discarding is formed at the time of discarding on the recording medium with a second color at a position at which at least a part of the image at the time of discarding is superimposed on the image at the time of formation, and
    the determining determines the erasure completion information based on a disposal image having the first color that is included in single image data output when the recording medium is image-captured as the object.

4. The content management method according to claim 1, wherein
    the image at the time of discarding is formed at the time of discarding at a position determined with reference to the image at the time of formation, and
    the determining determines that the content formed on the recording medium has been erased on condition that a position of the image at the time of formation relative to the image at the time of discarding is a predetermined relative position, wherein the image at the time of formation and the image at the time of discarding are included in single image data output when the recording medium is image-captured as the object.

5. The content management method according to claim 1, further comprising:
    obtaining medium identification information used to identify a recording medium on which the image of the content is formed;
    further associating the obtained medium identification information with the content; and
    in a case where the medium identification information is identified from single image data output when the recording medium is image-captured as the object, determining the content associated with the medium identification information.

6. The content management method according to claim 5, further comprising:
    forming, on the recording medium when the image of the content is formed, an image indicating the medium identification information.

7. The content management method according to claim 5, wherein
    the medium identification information recorded on the recording medium is obtained before the image of the content is formed.

8. A non-transitory recording medium storing a computer readable content management program causing a hardware processor to execute the method according to claim 1.

9. A content management system comprising:
    an image forming device that fixedly forms information on a recording medium as an image;
    an image capturing device that image-captures an object and outputs image data including an image of the object; and
    a content manager that manages a content and includes a hardware processor that executes the method according to claim 1.

10. A content management method executed in a content management system, the content management method comprising:
    obtaining medium identification information used to identify a recording medium on which an image of the content is formed;
    associating the content with the obtained medium identification information and erasure completion information indicating that the content has been erased;
    forming, on the recording medium, the image of the content and an image of the medium identification information;
    in a case where an erasure image is formed to be superimposed on at least a part of the image of the content on the recording medium, forming, on the recording medium, the erasure image and an image at a time of discarding indicating the erasure completion information at a position determined with reference to the image of the medium identification information, wherein the image at the time of discarding is associated with the content; and in a case where single image data output when the recording medium is image-captured as object includes the image of the medium identification information and the image at the time of discarding, and in a case where a position of the image of the medium identification information relative to the image at the time of discarding is a predetermined relative position, determining that the content associated with the erasure completion information indicated by the image at the time of discarding has been erased.

\* \* \* \* \*